(12) United States Patent
Depraete

(10) Patent No.: US 10,054,208 B2
(45) Date of Patent: Aug. 21, 2018

(54) FREQUENCY DYNAMIC ABSORBER FOR TORSIONAL VIBRATION DAMPER OF HYDROKINETIC TORQUE COUPLING DEVICE

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 14/961,271

(22) Filed: Dec. 7, 2015

(65) Prior Publication Data
US 2017/0159783 A1    Jun. 8, 2017

(51) Int. Cl.
*F16H 45/02*    (2006.01)
*F16F 15/123*    (2006.01)
(Continued)

(52) U.S. Cl.
CPC ....... *F16H 45/02* (2013.01); *F16F 15/12353* (2013.01); *F16F 15/1428* (2013.01); *F16H 41/24* (2013.01); *F16H 41/28* (2013.01); *F16H 2045/0221* (2013.01); *F16H 2045/0263* (2013.01)

(58) Field of Classification Search
CPC .................. F16H 2045/0263; F16H 2045/0221
See application file for complete search history.

(56) References Cited

U.S. PATENT DOCUMENTS

2013/0205944 A1    8/2013  Sudau
2014/0048371 A1    2/2014  Roessner
(Continued)

FOREIGN PATENT DOCUMENTS

FR    2928433      9/2009
JP    2013160323   8/2013
(Continued)

OTHER PUBLICATIONS

International Application No. PCT/US15/19983, now PCT/IB15/00527, filed Mar. 11, 2015 in the name of Valeo Embrayages.
(Continued)

*Primary Examiner* — Mark A Manley
(74) *Attorney, Agent, or Firm* — Berenato & White, LLC

(57) ABSTRACT

A torsional vibration damper assembly for a hydrokinetic torque coupling device, comprises a torsional vibration damper, and a dynamic absorber operatively connected to the torsional vibration damper. The torsional vibration damper comprises a driven member rotatable about a rotational axis, a first retainer plate rotatable relative to the driven member coaxially with the rotational axis, and a plurality of damper elastic members interposed between the first retainer plate and the driven member. The damper elastic members elastically couples the first retainer plate to the driven member. The dynamic absorber includes an inertial member. The inertial member is mounted to the torsional vibration damper rotatably relative to the driven member. The inertial member is rotationally guided and centered relative to the rotational axis by the driven member of the torsional vibration damper.

20 Claims, 22 Drawing Sheets

(51) Int. Cl.
*F16H 41/28* (2006.01)
*F16H 41/24* (2006.01)
*F16F 15/14* (2006.01)

(56) References Cited

U.S. PATENT DOCUMENTS

| | | | |
|---|---|---|---|
| 2014/0345997 A1* | 11/2014 | Gerdeman | F16D 33/18 192/3.28 |
| 2014/0353105 A1 | 12/2014 | Tomiyama | |
| 2015/0260257 A1* | 9/2015 | Jimenez Perez Mitre | F16F 15/13453 192/3.28 |
| 2016/0116020 A1 | 4/2016 | Tomiyama | |

FOREIGN PATENT DOCUMENTS

| | | |
|---|---|---|
| WO | WO2014123174 | 8/2014 |
| WO | WO2014132906 | 9/2014 |
| WO | WO2014196340 | 12/2014 |
| WO | WO2015005379 | 1/2015 |
| WO | WO2015076003 A1 | 5/2015 |

OTHER PUBLICATIONS

International Search Report for PCT/EP2016/079896 dated Mar. 3, 2017.

* cited by examiner

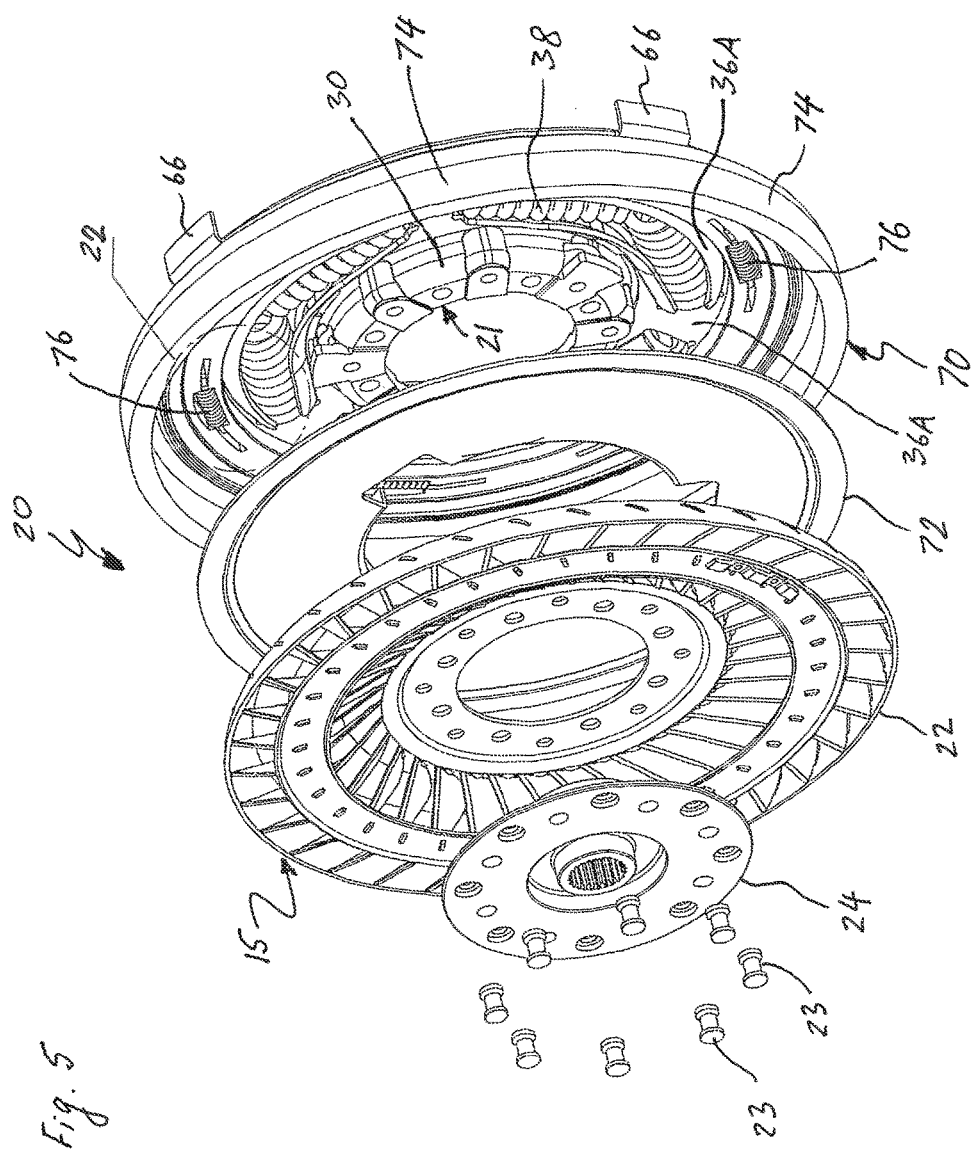

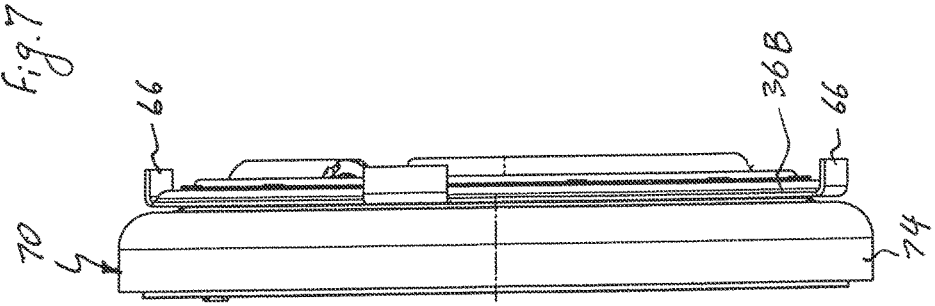
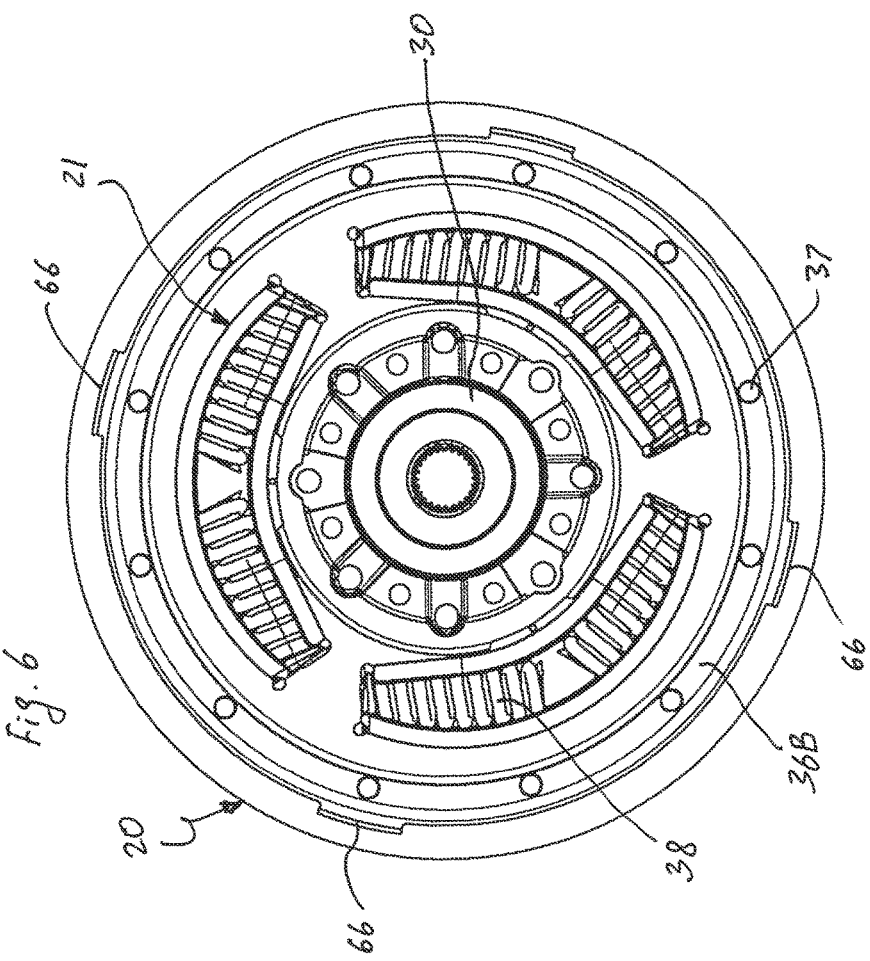

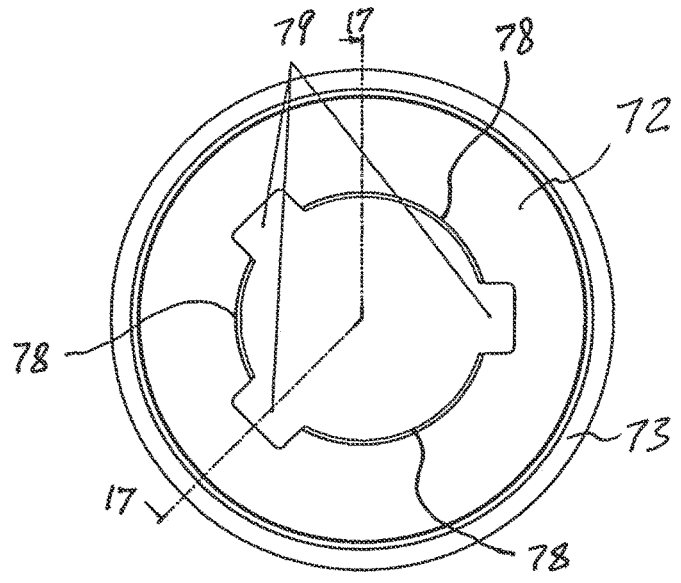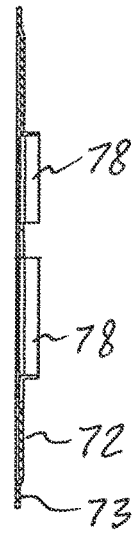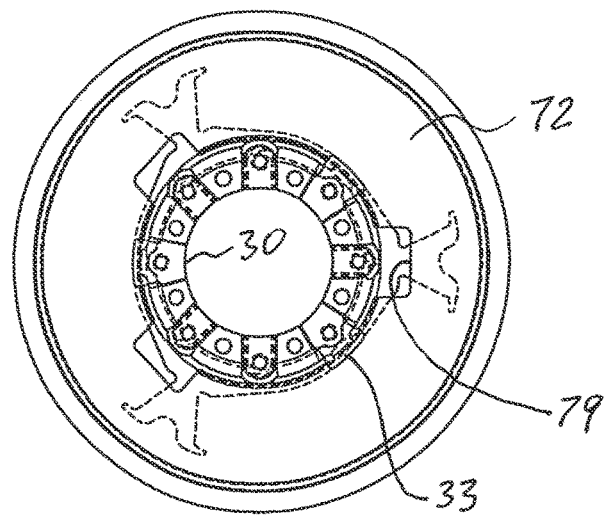
Fig. 16    Fig. 17
Fig. 18

FREQUENCY DYNAMIC ABSORBER FOR TORSIONAL VIBRATION DAMPER OF HYDROKINETIC TORQUE COUPLING DEVICE

BACKGROUND OF THE INVENTION

1. Field of the Invention

The present invention generally relates to hydrokinetic torque coupling devices, and more particularly to hydrokinetic torque coupling devices with a dynamic absorber for a torsional vibration damper.

2. Background of the Invention

An internal combustion engine exhibits irregularities due to the succession of combustion events in the engine cylinders. Torsional damping devices allow these irregularities to be filtered before the drive torque is transmitted to an automotive transmission. The vibrations preferably are damped before they enter the transmission and produce what may be considered unacceptably troublesome noise. To accomplish this, it is known to interpose a torsion damping device between a drive shaft and a transmission (or driven) shaft. The torsion damping device is typically arranged in a hydrokinetic torque coupling device that allows temporary rotational connection of the drive shaft to the transmission shaft.

Typically, a hydrokinetic torque coupling device includes a hydrodynamic torque converter and a torsion damping device positioned between an axially oriented coaxial drive shaft and a driven shaft of the automotive transmission. The torsion damping device includes a torque input element and a torque output element, and circumferentially acting elastic members. The circumferentially acting elastic members are interposed between the torque input element and the torque output element. In so-called "long travel" damping devices, the elastic members are mounted, in groups of at least two elastic members, in series between the input element and output element.

A torque converter of this kind typically has a rotating casing that is capable of transmitting drive torque to the damping device by means of a friction locking clutch, traditionally called a lock-up clutch. The torque converter also usually has a turbine wheel mounted rotatably inside the casing.

For some applications, the torsion damping device may also include a dynamic absorber having a heavy inertia member. A dynamic absorber having a heavy inertia member is arranged around the rotational axis of the engine shaft and is free to oscillate around an axis substantially parallel to the rotational axis of the engine shaft. The dynamic absorber is provided to lower a resonance frequency at low rotational speed of the engine and further improve the vibration damping performance.

While hydrokinetic torque coupling devices and torsion damping devices with dynamic absorbers, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a torsional vibration damper assembly for a hydrokinetic torque coupling device. The torsional vibration damper assembly comprises a torsional vibration damper, and a dynamic absorber operatively connected to the torsional vibration damper. The torsional vibration damper comprises a driven member rotatable about a rotational axis, a first retainer plate rotatable relative to the driven member coaxially with the rotational axis, and a plurality of damper elastic members interposed between the first retainer plate and the driven member. The damper elastic members elastically couple the first retainer plate to the driven member. The dynamic absorber includes an inertial member. The inertial member is mounted to the torsional vibration damper rotatably relative to the driven member. The inertial member is rotationally guided and centered relative to the rotational axis by the driven member of the torsional vibration damper.

According to a second aspect of the present invention, there is provided a hydrokinetic torque coupling device for coupling together a driving shaft and a driven shaft. The hydrokinetic torque coupling device of the present invention comprises an impeller coaxially aligned with a rotational axis and comprising an impeller shell, a casing comprising the impeller shell and a casing shell interconnected to and non-rotatable relative to the impeller shell, a turbine coaxially aligned with and drivable by the impeller and comprising a turbine shell, a stator situated between the impeller and the turbine, a torsional vibration damper, a turbine hub, and a dynamic absorber including an inertial member operatively connected to the torsional vibration damper. The torsional vibration damper comprises a driven member rotatable about the rotational axis, a first retainer plate rotatable relative to the driven member coaxially with the rotational axis, and a plurality of damper elastic members interposed between the first retainer plate and the driven member for elastically coupling the first retainer plate to the driven member. The turbine hub is non-rotatably coupled to the turbine shell and the driven member of the torsional vibration damper. The inertial member is mounted to the torsional vibration damper rotatably relative to the driven member and is rotationally guided and centered relative to the rotational axis by the driven member of the torsional vibration damper.

According to a third aspect of the invention, there is provided a method for assembling a torsional vibration damper assembly for a hydrokinetic torque coupling device. The method comprises the steps of providing a preassembled torsional vibration damper, and providing a dynamic absorber including an inertial member. The torsional vibration damper comprises a driven member rotatable about the rotational axis, a first retainer plate rotatable relative to the driven member coaxially with the rotational axis, and a plurality of damper elastic members interposed between the first retainer plate and the driven member for elastically coupling the first retainer plate to the driven member. The method of the present invention further comprises the step of mounting the dynamic absorber to the torsional vibration damper so that the dynamic absorber rotationally guided and centered relative to the rotational axis by the driven member of the torsional vibration damper.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 5 is a partial exploded assembly view of the torsional vibration damper assembly in accordance with the exemplary embodiment of the present invention;

FIG. 6 is a front plan view of the torsional vibration damper assembly in accordance with the exemplary embodiment of the present invention;

FIG. 7 is a side elevational view of the torsional vibration damper assembly in accordance with the exemplary embodiment of the present invention;

FIG. 16 is a front plan view of the connecting plate of the dynamic absorber in accordance with the exemplary embodiment of the present invention;

FIG. 17 is a side elevational view of the connecting plate of the dynamic absorber taken along the line 17-17 in FIG. 16;

FIG. 18 is a front plan view of the connecting plate of the dynamic absorber assembled to the driven member of the torsional vibration damper in accordance with the exemplary embodiment of the present invention;

Figure 1:
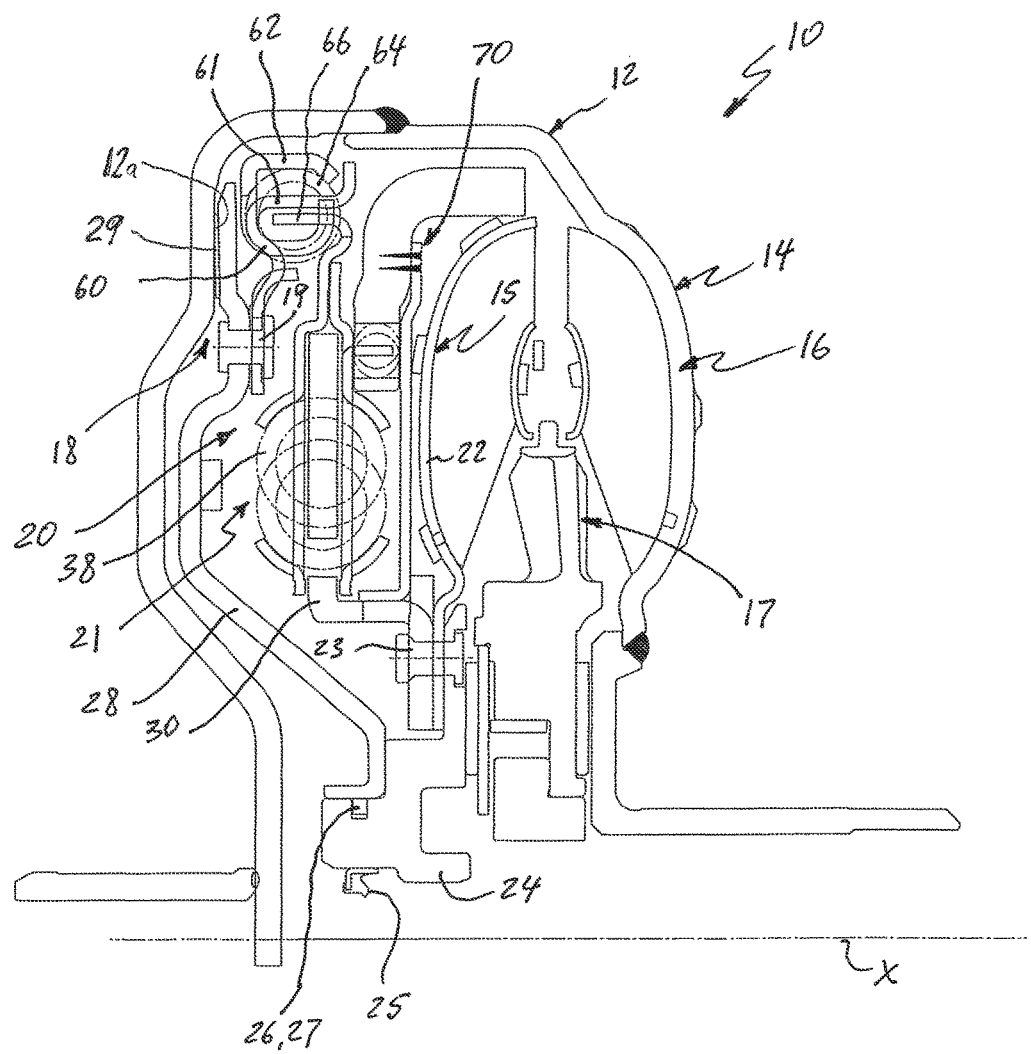
FIG. 1 is a fragmented half-view in axial section of a hydrokinetic torque coupling device in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

An exemplary embodiment of a hydrokinetic torque coupling device is generally represented in the accompanying drawings by reference numeral 10, as best shown in the fragmentary sectional view in FIG. 1. The hydrokinetic torque coupling device 10 is operable in known manner to fluidly couple a driving shaft and a driven shaft of a motor vehicle, such as of an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 comprises a sealed casing 12 filled with oil and rotatable about a rotation axis X. The hydrokinetic torque coupling device 10 further comprises a hydrodynamic torque converter 14, a lock-up clutch 18 and a torsional vibration damper assembly (also referred to herein as a damper assembly) 20, all disposed in the sealed casing 12. The torsional vibration damper assembly 20 is mounted to the torque converter 14. Hereinafter the axial and radial orientations are considered with respect to the rotation axis X of the torque coupling device 10.

The torque converter 14, the lock-up clutch 18 and the torsional vibration damper assembly 20 are all rotatable about the rotation axis X. The torque converter 14 comprises a turbine wheel 15, an impeller wheel 16, and a reactor (or stator) 17 interposed axially between the turbine wheel 15 and the impeller wheel 16. The turbine wheel 15 includes a substantially semi-toroidal turbine shell 22, as best shown in FIG. 1.

The torque coupling device 10 also includes a substantially annular turbine (or output) hub 24 rotatable about the rotation axis X, which is arranged to non-rotatably couple together the driven shaft and the turbine wheel 15. In the following description, axial and radial orientations will be considered with respect to the rotation axis X of the turbine hub 24.

The turbine shell 22 of the turbine wheel 15 is non-movably (i.e., fixedly) secured to the turbine hub 24 by appropriate means, such as by rivets 23 or welding. The turbine hub 24 has internal splines and is non-rotatably coupled to the driven shaft, such as an input shaft of the automatic transmission of the motor vehicle, which is provided with complementary external splines. Alternatively, a weld or other connection may be used to fix (i.e., non-movably secure) the turbine hub 24 to the driven shaft. A radially outer surface of the turbine hub 24 includes an annular slot 26 for receiving a sealing member 27, such as an O-ring. The turbine hub 24 is rotatable about the rotation axis X and is coaxial with the driven shaft so as to center the turbine wheel 15 on the driven shaft. A sealing member 25 (shown in FIG. 1), mounted to a radially inner peripheral surface of the turbine hub 24, creates a seal at the interface of the transmission input shaft and the turbine hub 24.

The lock-up clutch 18 is provided for selectively locking the driving and driven shafts. The lock-up clutch 18 is generally activated after starting of the motor vehicle and after hydraulic coupling of the driving and driven shafts, in order to avoid the loss of efficiency caused in particular by slip phenomena between the turbine wheel 15 and the impeller wheel 16. Specifically, the lock-up clutch 18 is provided to bypass the turbine wheel 15 when in the closed state. When the lock-up clutch 18 is in the engaged (locked) position, the engine torque is transmitted by the casing 12 to the turbine hub 24 through the torsional vibration damper assembly 20.

The lock-up clutch 18 includes a substantially annular locking piston 28, including an annular friction liner 29 fixedly attached to an axially outer surface of the locking piston 28 that faces locking wall 12a of the casing 12 by appropriate means known in the art, such as by adhesive bonding. As best shown in FIG. 1, the friction liner 29 is fixedly attached to the axially outer surface of the locking piston 28 at a radially outer peripheral end thereof. The locking piston 28 is slidably mounted to the turbine hub 24 for axially reciprocating movement thereon.

The locking piston 28 is axially displaceable toward (an engaged (or locked) position of the lock-up clutch 18) and away (a disengaged (or open) position of the lock-up clutch 18) from the locking wall 12a inside the casing 12. Moreover, the locking piston 28 is axially displaceable away from (the engaged (or locked) position of the lock-up clutch 18) and toward (the disengaged (or open) position of the lock-up clutch 18) the turbine hub 24.

The torsional vibration damper assembly 20 advantageously allows the impeller wheel 16 of the torque converter 14 to be coupled, with torque damping, to the turbine hub 24, and thus to the input shaft of the automatic transmission. The torsional vibration damper assembly 20 also allows damping of stresses between a first, drive shaft (not shown) and a second, driven shaft (not shown) that are coaxial with the rotation axis X, with torsion damping.

The torsional vibration damper assembly 20, as best shown in FIGS. 1, 2, 5A-6, is disposed between the turbine hub 24 that is fixedly (i.e., non-movably) connected with the turbine shell 22 of the turbine wheel 15, and the locking piston 28 of the lock-up clutch 18. Moreover, the locking piston 28 of the lock-up clutch 18 is rotatably coupled to the turbine wheel 15 and the turbine hub 24 by the torsional vibration damper 20. The torsional vibration damper assembly 20 is arranged on the turbine hub 24 in a limited, movable and centered manner. The turbine hub 24 forms an output part of the torsional vibration damper assembly 20 and a driven side of the torque coupling device 10, and is splined with the driven shaft. The locking piston 28, on the other hand, forms an input part of the torsional vibration damper 20.

During vehicle operation, when the lock-up clutch 18 is in the disengaged (open) position, the engine torque is transmitted by the turbine wheel 15 of the torque converter 14 from the impeller wheel 16 to the turbine hub 24, bypassing the torsional vibration damper assembly 20. However, when the lock-up clutch 18 is in the engaged (locked) position, the engine torque is transmitted by the casing 12 to the turbine hub 24 through the torsional vibration damper assembly 20.

Figure 2:
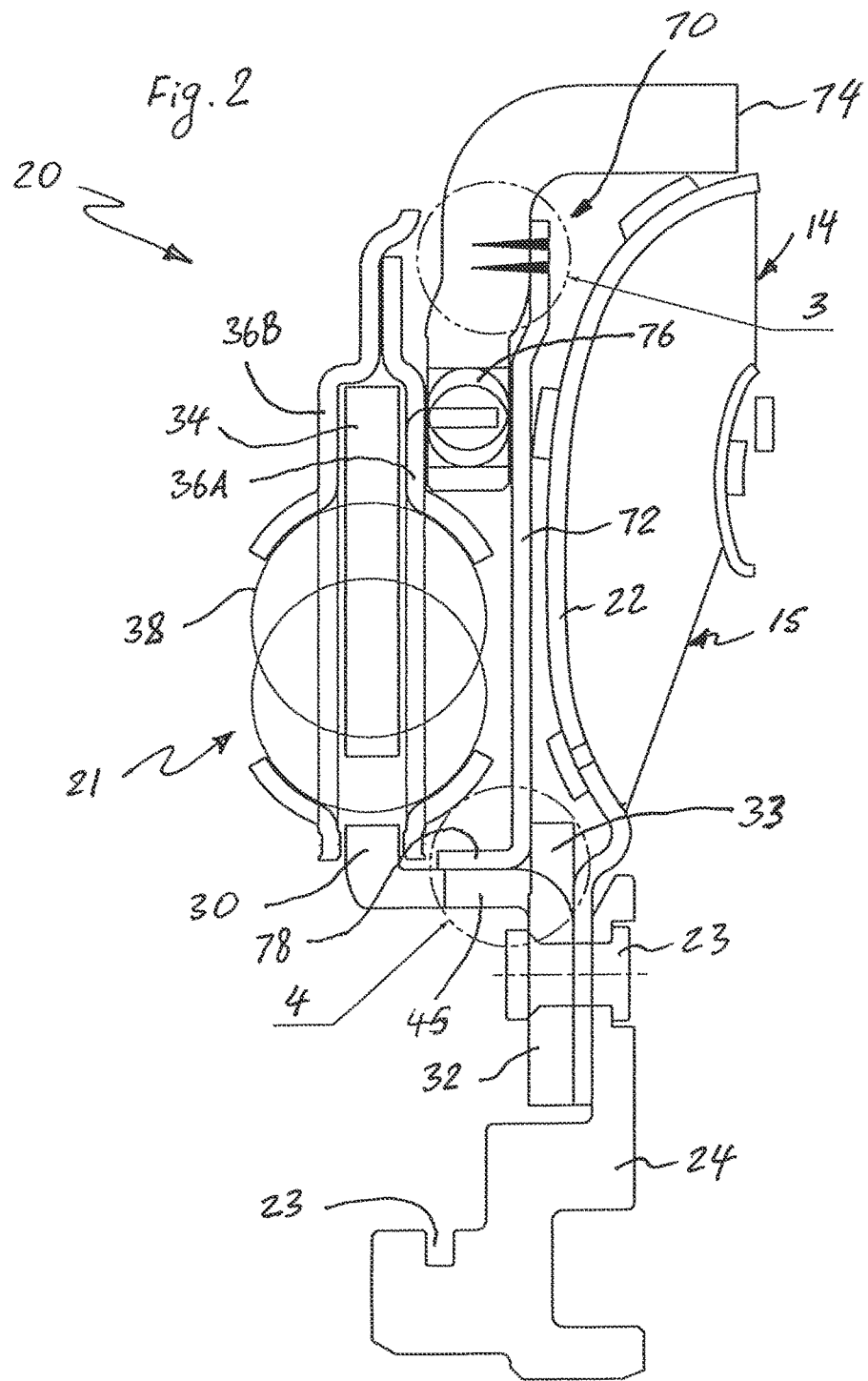
FIG. 2 is a fragmentary cross-sectional half-view of a torsional vibration damper assembly the hydrokinetic torque coupling device in accordance with the exemplary embodiment of the present invention.
Figure 3:
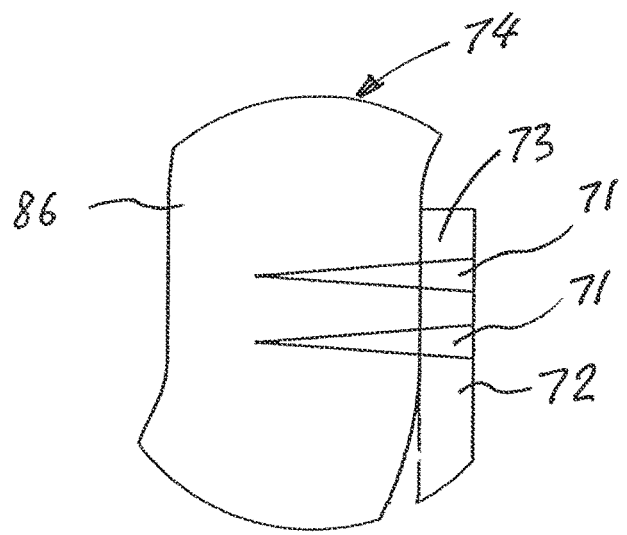
FIG. 3 is an enlarged view of a fragment of the torsional vibration damper assembly shown in the circle "3" of FIG. 2.

As best shown in FIGS. 1, 2 and 5, the torsional vibration damper assembly 20 includes a torsional vibration damper 21 operatively coupled to the turbine wheel 15 and the turbine hub 24 of the torque converter 14, and a dynamic absorber 70 operatively connected to the torsional vibration damper 21.

Figure 10:
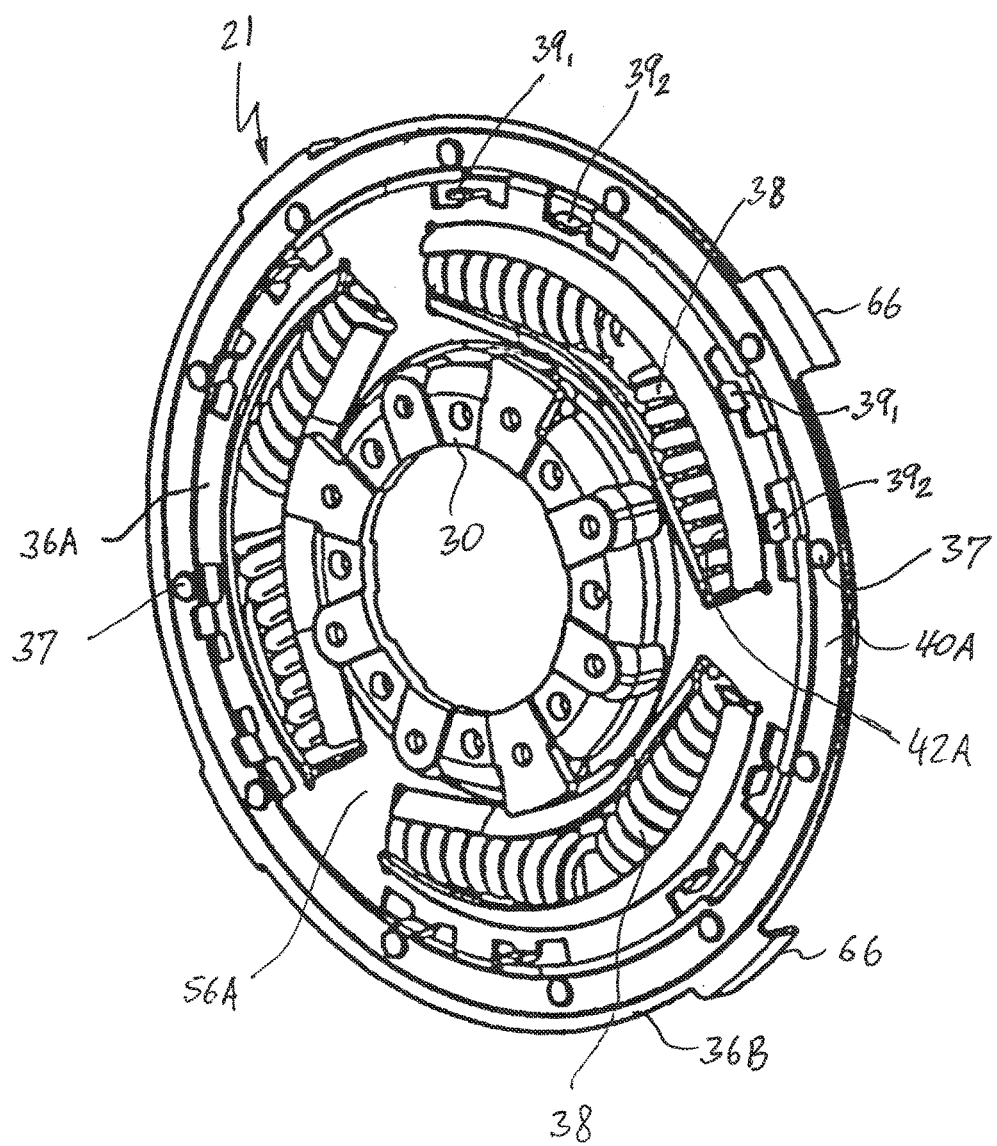
FIG. 10 is a perspective view of a torsional vibration damper in accordance with the exemplary embodiment of the present invention.
Figure 11:
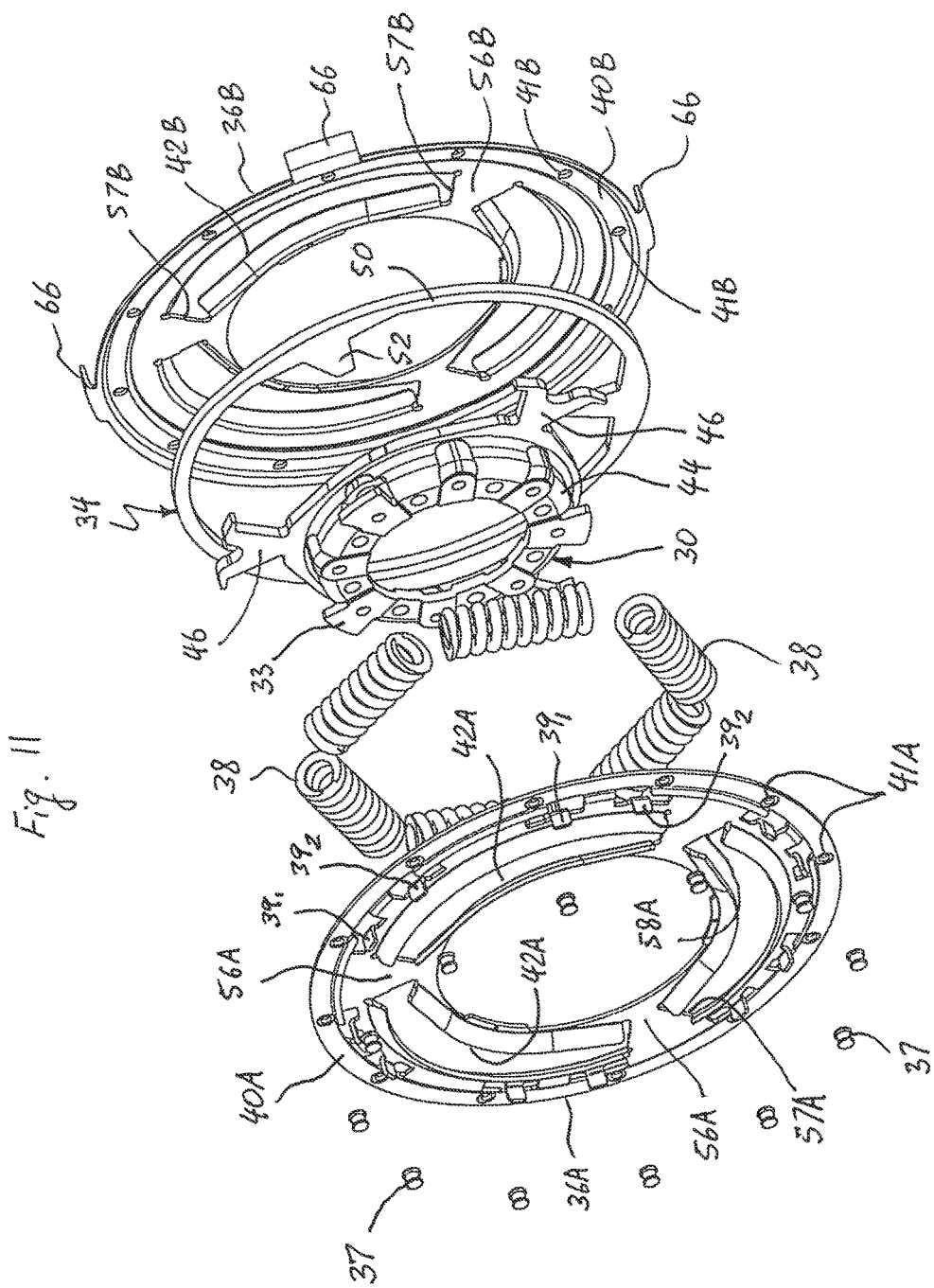
FIG. 11 is an exploded assembly view of the torsional vibration damper in accordance with the exemplary embodiment of the present invention.
Figure 12:
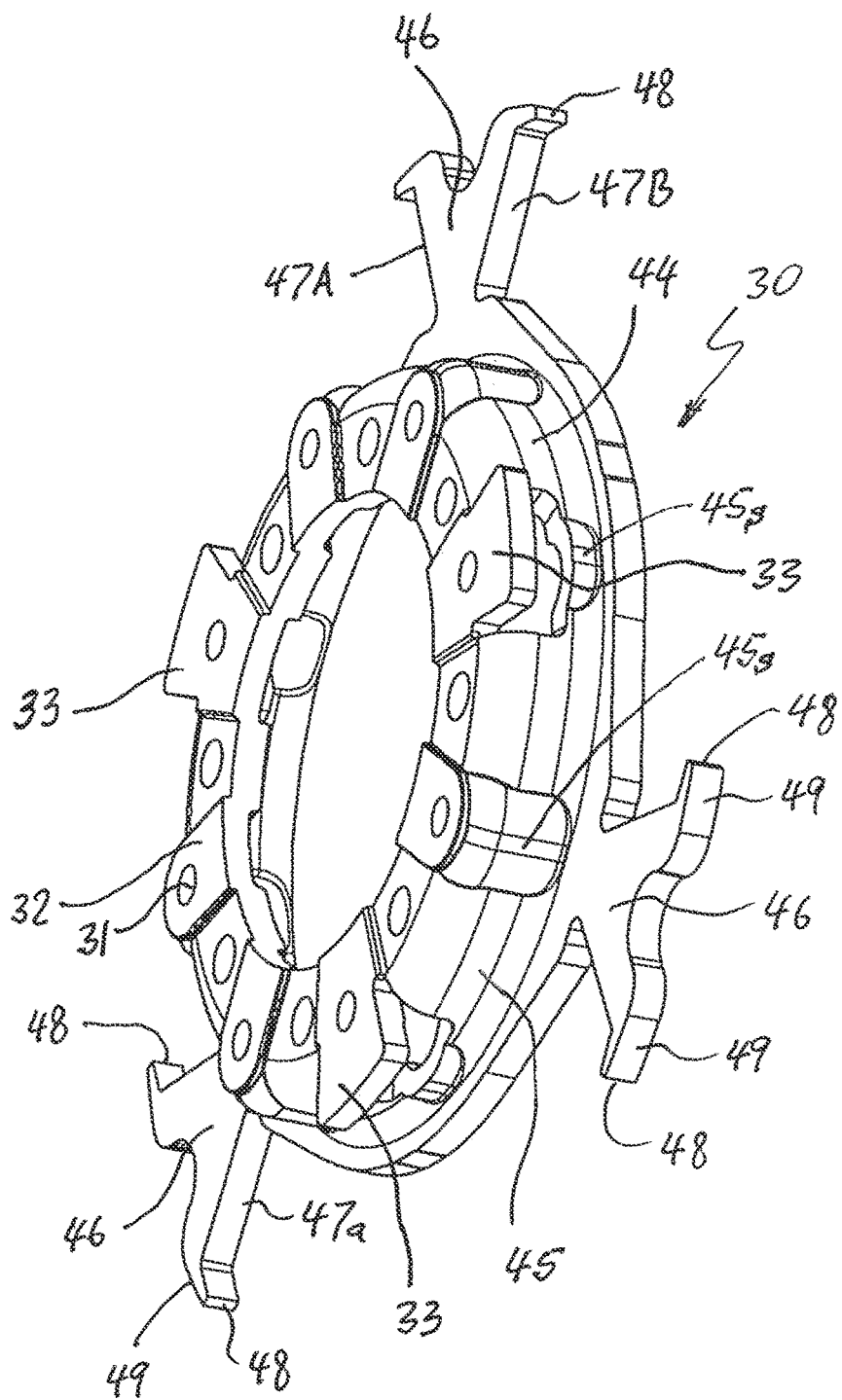
FIG. 12 is a perspective view of a driven member of the torsional vibration damper in accordance with the exemplary embodiment of the present invention.

As best shown in FIGS. 1, 2, 5, 10 and 11, the torsional vibration damper 21 comprises a substantially annular driven member 30 fixedly (i.e., non-movably) secured to the turbine hub 24, and a substantially annular intermediate member 34 mounted about the driven member 30 and rotatably moveable relative thereto. The driven member 30, as best shown in FIG. 12, has an integrally formed and radially inwardly extending flange 32. The flange 32 of the driven member 30 is fixedly (i.e., non-movably) secured to the turbine hub 24 by appropriate means, such as by the rivets 23 or welding. Thus, the turbine shell 22 of the turbine wheel 15 is fixedly secured to both the turbine hub 24 and the driven member 30 by appropriate means, such as by the rivets 23 or welding. The driven member 30 constitutes an output member of the torsional vibration damper 21.

The torsional vibration damper 21 further comprises a substantially annular first retainer plate 36A, a substantially annular second retainer plate 36B disposed axially opposite the first retainer plate 36A, and a plurality of circumferentially acting damper elastic members (or torque transmitting elements) 38 disposed in series relative to each other between the driven member 30 and the first and second retainer plates 36A, 36B, as best shown in FIGS. 1, 2 and 9-11. The first and second retainer plates 36A, 36B are mounted adjacent to axially opposite sides (surfaces) of the driven member 30 and the intermediate member 34 so as to be oriented parallel to each other and coaxially with the rotation axis X. The first and second retainer plates 36A, 36B are non-movably (i.e., fixedly) secured to one another by appropriate means, such as by fasteners or welding, so as to rotatable relative to the driven member 30. Thus, the first and second damper retainer plates 36A, 36B are non-rotatable relative to one another, but rotatable relative to the driven member 30 and the intermediate member 34. Each of the damper elastic members 38 is disposed circumferentially in series between the driven member 30 and the first and second damper retainer plates 36A, 36B. Specifically, the damper elastic members 38 are interposed between the first and second damper retainer plates 36A, 36B and the intermediate member 34, and between the intermediate member 34 and the driven member 30 in series.

According to the exemplary embodiment of the present invention, the damper elastic members 38 are identical to each other. In non-limiting fashion, the torsional vibration damper 21 according to the exemplary embodiment of the present invention has six damper elastic members 38, as best shown in FIGS. 6, 10 and 11. Further according to the present invention, each of the damper elastic members 38 is in the form of helical (or coil) spring having a principal axis oriented substantially circumferentially. Furthermore according to the exemplary embodiment of the present invention, each of the damper elastic members 38 includes only one coaxial helical spring. Alternatively, each of the damper elastic members 38 may include a pair of coaxial helical springs. Specifically, each of the damper elastic members 38 may include an external large-diameter spring and an internal small-diameter spring, arranged coaxially so that the internal spring is disposed within the external spring.

Moreover, the first and second retainer plates 36A, 36B are arranged axially on either side of the damper elastic members 38 and are operatively connected therewith. The first and second retainer plates 36A, 36B are non-movably (i.e., fixedly) secured to one another by appropriate means, such as by rivets 37 or welding, so as to be rotatable relative to the driven member 30. Thus, the first and second retainer plates 36A, 36B are non-rotatable relative to one another, but rotatable relative to the driven member 30 and the intermediate member 34. Each of the damper elastic members 38 is disposed circumferentially between the driven member 30 and the intermediate member 34.

According to the exemplary embodiment of the present invention as best illustrated in FIGS. 10 and 11, the first retainer plate 36A has a substantially annular outer mounting flange 40A provided with a plurality of circumferentially spaced holes 41A. The second retainer plate 36B, on the other hand, has a substantially annular outer mounting flange 40B provided with a plurality of circumferentially spaced holes 41B. The first and second retainer plates 36A, 36B are non-movably (i.e., fixedly) secured to one another so that the outer mounting flanges 40A, 40B of the first and second retainer plates 36A, 36B engage axially opposite surfaces through rivets 37 extending through the holes 41A, 41B in the outer mounting flanges 40A, 40B of the first and second damper retainer plates 36A, 36B. Thus, the first and second retainer plates 36A, 36B are non-rotatable relative to one another, but rotatable relative to the driven member 30 and the intermediate member 34.

Each of the first and second retainer plates 36A, 36B is provided with a plurality of circumferentially extending windows (or window-shaped openings) 42A, 42B, respectively, each of which is arranged in correspondence with a pair of the inner elastic damping members 38, as best depicted in FIGS. 10 and 11.

The windows 42A, 42B are separated circumferentially from one another alternately by radial tabs 56A, 56B. Each of the first and second retainer plates 36A, 36B according to the first exemplary embodiment of the present invention has three windows 42A, 42B and three radial tabs 56A, 56B. Moreover, each of the windows 42A, 42B, or each of the radial tabs 56A, 56B, is delimited circumferentially by a first radial end face 57A, 57B on the one hand, and by a second radial end face 58A, 58B on the other hand, oriented circumferentially opposite to each other. Thus, each of the radial tabs 56A, 56B is interposed circumferentially between the two damper elastic members 38 in series of each pair. The first radial end faces 57A, 57B and the second radial end faces 58A, 58B are interposed between the damper elastic members 38 of a single pair and are thus carried by one common radial tab 56A, 56B.

According to the first exemplary embodiment of the present invention, as best shown in FIG. 11, each of the first and second retainer plates 36A, 36B is preferably a stamped integral member of suitable metallic construction, e.g., made of a single or unitary component, but may be separate components fixedly connected together.

The driven member 30, as best shown in FIGS. 11 and 12, includes a substantially annular central portion 44 and a plurality of external radial lugs 46 extending radially outwardly from the central portion 44. The external radial lugs 46 cooperate with the circumferentially acting radially inner damper elastic members (or torque transmitting elements) 38. Each of the external lugs 46 of the driven member 30 and the central portion 44 are preferably integral with one another, e.g., made of a single or unitary component, but may be separate components fixedly connected together.

The driven member 30 constitutes an output member of the torsional vibration damper 21. Also, the central portion 44 of the driven member 30 has a guiding flange 45 extending both circumferentially and axially from the external radial lugs 46 of the driven member 30, as best shown in FIG. 12. As best shown in FIG. 2, the radially inwardly extending flange 32 is disposed radially inside of the guiding flange 45. The guiding flange 45 of the driven member 30 has a circumferentially (i.e., angularly) extending guiding surface 45s facing the first retainer plate 36A and the dynamic absorber 70.

The external lugs 46 are spaced apart circumferential equidistantly around the rotation axis X. Each of the external radial lugs 46 has circumferentially positioned first and second radial retention faces 47A and 47B, respectively, engaging the first damper elastic members 38. Also, each of the external radial lugs 46 has two circumferentially opposite, circumferentially extending gripping portions 48, as best shown in FIGS. 6 and 7, retaining the distal ends of the first damper elastic members 38 on the retention faces 47A and 47B of each of the external radial lugs 46. Each of the external radial lugs 46 has a substantially cylindrical outer peripheral surface 49. The central portion 44 of the driven member 30 is provided with a plurality of circumferentially spaced holes 31. The driven member 30 is fixedly secured to the turbine hub 24 by the rivets 23 extending through the holes 31 in the central portion 44 of the driven member 30.

Figure 13:
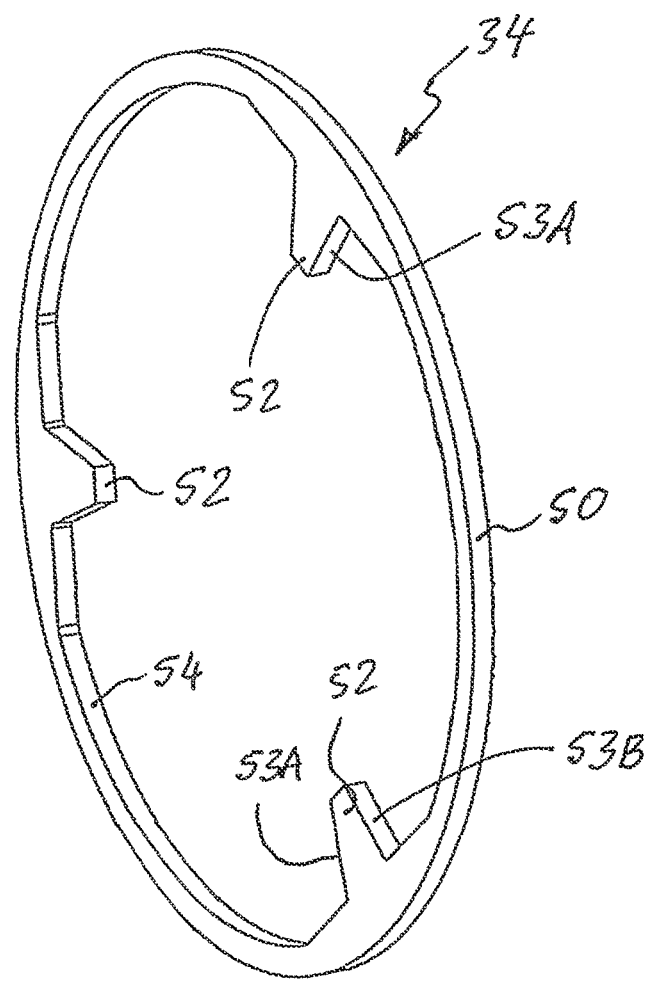
FIG. 13 is a perspective view of an intermediate member of the torsional vibration damper in accordance with the exemplary embodiment of the present invention.

Similarly, as best shown in FIGS. 11 and 13, the intermediate member 34 is formed with a plurality of internal radial lugs 52 which cooperate with the circumferentially acting damper elastic members 38. As best illustrated in FIG. 13, the internal radial lugs 52 extend radially inwardly from a generally annular body portion 50 of the intermediate member 34. Moreover, the internal radial lugs 52 are equiangularly spaced apart around the rotational axis X. Each of the internal radial lugs 52 has circumferential first and second radial retention faces 53A and 53B, respectively. As best shown in FIG. 6, the first retention faces 53A of the internal radial lugs 52 of the intermediate member 34 face the first retention faces 47A of the external radial lugs 46 of the driven member 30 and engage the damper elastic members 38, while the second retention faces 53B of the internal radial lugs 52 of the intermediate member 34 face the second retention faces 47B of the external radial lugs 46 of the driven member 30 and engage the damper elastic members 38. In non-limiting fashion, in accordance with the first exemplary embodiment of the present invention, each of the internal radial lugs 52 has a substantially frustotriangular shape extending radially inwardly. The substantially cylindrical outer peripheral surface 49 of each of the radial lugs 46 of the driven member 30 is adjacent and complementary to a substantially cylindrical inner peripheral surface 54 of the body portion 50 of the intermediate member 34, and serves to center the intermediate member 34 with respect to the rotational axis X. As further shown in FIGS. 10 and 11, each of the damper elastic members 38 is disposed and compressed between the external radial lugs 46 of the driven member 30 and the internal radial lugs 52 of the intermediate member 34 in order to damp sudden changes in torque. Moreover, each of the windows 42A, 42B receives a single pair of the first damper elastic members 38 separated by the internal radial lug 52 of the intermediate member 34, as best shown in FIGS. 5 and 10.

The torsional vibration damper 21 further comprises a substantially annular drive member 60 and a substantially annular connecting member 62 rotatably coupled to the drive member 60 (as best shown in FIG. 1). The driven member 30 is rotatably moveable relative to both the drive member 60 and the connecting member 62. The drive member 60 constitutes an input member of the torsional vibration damper 21, while the driven member 30 constitutes an output member of the torsional vibration damper 21. As best shown in FIGS. 1-6, the drive member 60, the connecting member 62 and the annular driven member 30 are coaxial with each other and rotatable about the rotational axis X. The drive member 60 is non-movably (i.e., fixedly) secured to the locking piston 28 by appropriate means, such as by rivets 19 or welding. The driven member 30 is operatively associated with the turbine wheel 15 and coaxial with the turbine hub 24. The turbine shell 22 of the turbine wheel 15 is fixedly secured to both the turbine hub 24 and the driven member 30 by any appropriate means, such as by the rivets 23 or welding.

The annular drive member 60 includes external (or peripheral), radially outwardly extending driving tabs (or abutment elements) 61 circumferentially equidistantly disposed about an outer periphery thereof for driving engagement with the damper assembly 21, as described below. The drive member 60 with the driving tabs 61 is preferably an integral part, e.g., made of a single or unitary component, but may be separate components fixedly connected together. Preferably, the driving tabs 61 are integrally press-formed on the drive member 60 so as to be equiangularly spaced from each other.

The connecting member 62 includes internal, radially inwardly extending tabs (or abutment elements) circumferentially equiangularly disposed about an inner periphery thereof. The connecting member 62 is preferably a stamped member of suitable metallic construction with the inwardly extending tabs preferably being an integral part, e.g., made of a single or unitary component, but may be separate components fixedly connected together. Preferably, the inwardly extending tabs are integrally press-formed on the connecting member 62 so as to be equiangularly spaced from each other.

The torsional vibration damper 21 further comprises a plurality of ancillary (or radially outer) damper elastic members (or torque transmitting elements) 64, such as coil springs (damper springs) disposed in series relative to each other between the drive member 60 and the connecting member 62, as best shown in FIG. 1. As best shown in FIG. 1, the ancillary damper elastic members (or the outer damper elastic members) 64 are disposed radially outwardly of the damper elastic members (or the inner damper elastic members) 38. The radially outer damper elastic members 64 include circumferentially acting elastic members, such as coil springs, disposed in series relative to each other between the drive member 60 and the connecting member 62, as best shown in FIG. 1. The ancillary damper elastic members 64 are distributed circumferentially around the rotational axis X. As further illustrated in FIG. 1, the radially inner and outer elastic damping members 38, 64, respectively, are radially spaced from each other.

The connecting member 62 defines a substantially annular groove (or channel) that partially houses the ancillary damper elastic members 64, which are distributed about the circumference of the annular groove of the connecting member 62 so as to support the ancillary damper elastic members 64 against centrifugal force. Moreover, each of the ancillary damper elastic members 64 is disposed circumferentially between the driving tabs 61 of the drive member 60 and the internal tabs of the connecting member 62.

As best shown in FIGS. 1 and 5, the first retainer plate 36B further includes one or more peripheral abutment elements 66 extending axially outwardly from the outer mounting flange 40B of the second retainer plate 36B away from the first retainer plate 36A toward the drive member 60 and the locking piston 28. According to the exemplary embodiment of the present invention, the abutment elements 66 are integrally press-formed with the second retainer plate 36B so as to be equiangularly spaced from each other. The abutment elements 66 have circumferentially opposite abutment surfaces on circumferential ends of the mutually facing abutment elements 66. The abutment elements 66 of the second damper retainer plate 36B engage the ancillary damper elastic members 64. Thus, the second damper retainer plate 36B is operatively and rotatably connected to the drive member 60 through the ancillary damper elastic members 64.

The ancillary damper elastic members 64 are held in the interface between the internal tabs of the connecting member 62, the driving tabs 61 of the drive member 60 and the abutment elements 66 of the second damper retainer plate 36B so as to transmit damped rotational torque from the locking piston 28 to the first and second retainer plates 36A, 36B through the radially outer damper elastic members 64 and the connecting member 62. As best shown in FIG. 1, the driving tabs 61 of the drive member 60 and the abutment elements 66 of the second damper retainer plate 36B are circumferentially (or angularly) aligned with each other. In other words, the connecting member 62 is drivingly connected to the first and second retainer plates 36A, 36B through the radially outer damper elastic members 64. In turn, the drive member 60 is drivingly connected to the connecting member 62 through the radially outer damper elastic members 64. Thus, the radially outer damper elastic members 64 are disposed and are compressible between the driving tabs 61 of the drive member 60 and the internal tabs of the connecting member 62, and between the driving tabs 61 of the drive member 60 and the abutment elements 66 of the second damper retainer plate 36B.

During operation, when the lock-up clutch 18 is in the disengaged (open) position, the engine torque is transmitted from the impeller wheel 16 by the turbine wheel 15 of the torque converter 14 to the turbine hub 24. When the lock-up clutch 18 is in the engaged (locked) position (i.e., when the locking piston 28 is engaged (or locked) against the locking wall 12a of the casing 12 by action of the hydraulic pressure), the engine torque is transmitted by the casing 12 to the turbine hub 24 through the torsional vibration damper assembly 20.

The dynamic absorber 70 of the torsional vibration damper assembly 20 is operatively connected to the torsional vibration damper 21. The dynamic absorber 70 functions as a dynamic damper for further dampening the torsional vibration (variation in speed of rotation) transmitted to the driven member 30 of the torsional vibration damper 21.

The dynamic absorber 70 includes a substantially annular connecting plate 72, a substantially annular inertial member (or absorber mass) 74 non-rotatably attached to the connecting plate 72 coaxially with the rotational axis X, and a plurality of circumferentially acting absorber elastic members 76 interposed axially between the first retainer plate 36A of the torsional vibration damper 21 and the connecting plate 72, as best shown in FIG. 5. Further according to the exemplary embodiment of the present invention, each of the absorber elastic members 76 is in the form of helical (or coil) spring having a principal axis oriented substantially circumferentially about the rotational axis X.

The connecting plate 72 is non-movably (i.e., fixedly) attached to the inertial member 74 and is rotationally mounted on (about, around) and directly slidingly supported by the guiding surface 45s of the guiding flange 45 of the driven member 30 of the torsional vibration damper 21. The inertial member 74 is rotatable relative to the first retainer plate 36A coaxially with the rotational axis X.

Figure 15:
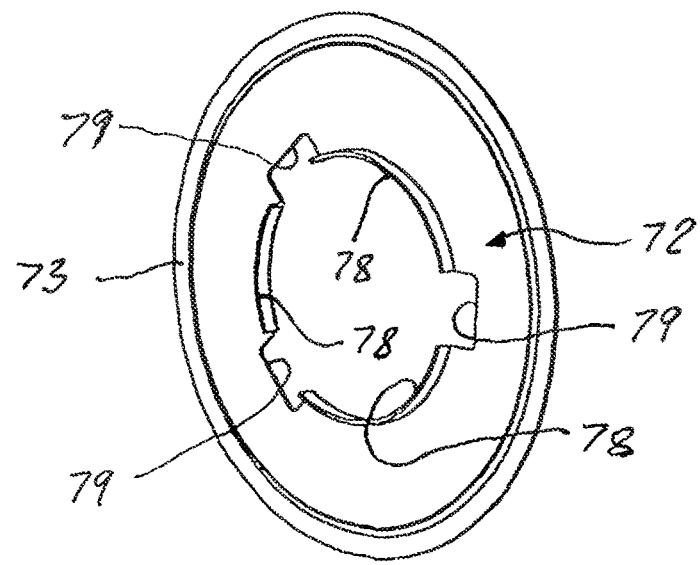
FIG. 15 is a perspective view of a connecting plate of the dynamic absorber in accordance with the exemplary embodiment of the present invention.

The connecting plate 72 has a substantially annular outer mounting flange 73 provided at an outer periphery of the connecting plate 72, and one or more circumferentially extending guided portions 78 extending axially inwardly from the connecting plate 72 toward the first retainer plate 36A. Each of the one or more guided portions 78 has a circumferentially extending guided surface 78s (best shown in FIGS. 2 and 4) facing the guiding surface 45s of the guiding flange 45 of the driven member 30. In non-limiting fashion, each of the circumferentially extending guided surface 78s of the guided portions 78 is in the form of a surface of revolution, such as a substantially curvilinear or cylindrical surface. According to the exemplary embodiment of the present invention, as best shown in FIG. 15, the connecting plate 72 has three guided portions 78.

Figure 4:
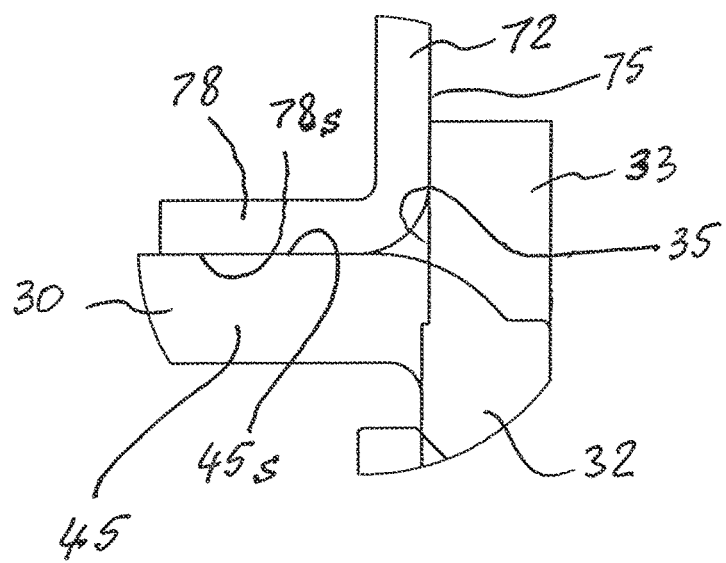
FIG. 4 is an enlarged view of a fragment of the torsional vibration damper assembly shown in the circle "4" of FIG. 2.
Figure 8:
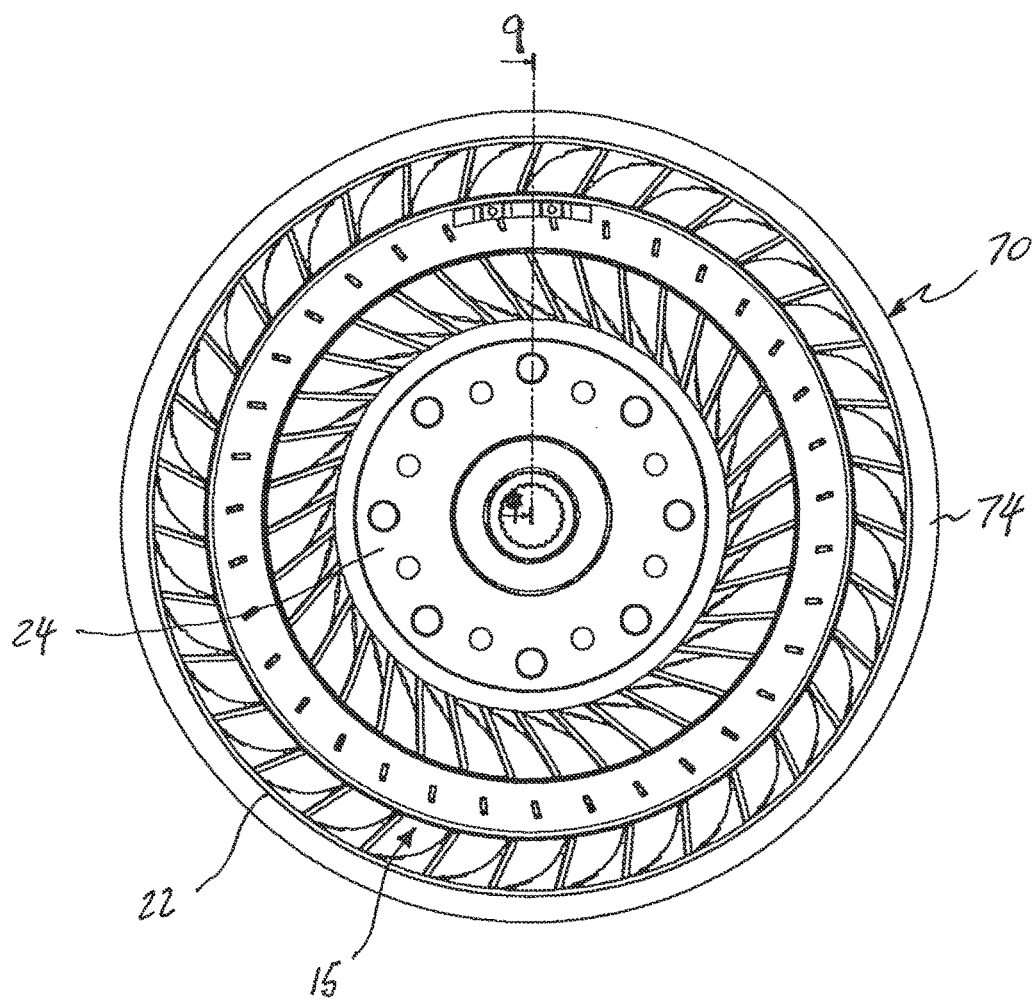
FIG. 8 is a rear plan view of the torsional vibration damper assembly in accordance with the exemplary embodiment of the present invention.

The relatively heavy inertia member 74 of the dynamic absorber 70 is centered and guided in order to not generate high imbalance and load in the components of the torsion damping device 21. Accordingly, the dynamic absorber 70 is mounted to the torsional vibration damper 21 so that the guided portions 78 of the connecting plate 72 rotationally engage the guiding surface 45s of the guiding flange 45 of the driven member 30 of the torsional vibration damper 21. In other words, the dynamic absorber 70 is rotationally guided and radially centered relative to the rotation axis X by directly rotationally slidingly engaging the guiding surface 45s of the guiding flange 45 of the driven member 30 of the torsional vibration damper 21, as best shown in FIGS. 2 and 4. Preferably, the one or more guided portions 78 are integrally press-formed with the connecting plate 72 so as to be equiangularly spaced from each other, as best shown in FIG. 15. The mounting flange 73 of the connecting plate 72 is non-movably (i.e., fixedly) attached to the inertial member 74, such as by one or more welds 71.

The connecting plate 72 and the inertial member 74 are elastically coupled to the first retainer plate 36A via the absorber elastic members 76, so that both the connecting plate 72 and the inertial member 74 are rotatable relative to the first retainer plate 36A coaxially with the rotational axis X. The connecting plate 72 is preferably made as a single or unitary component.

Figure 14:
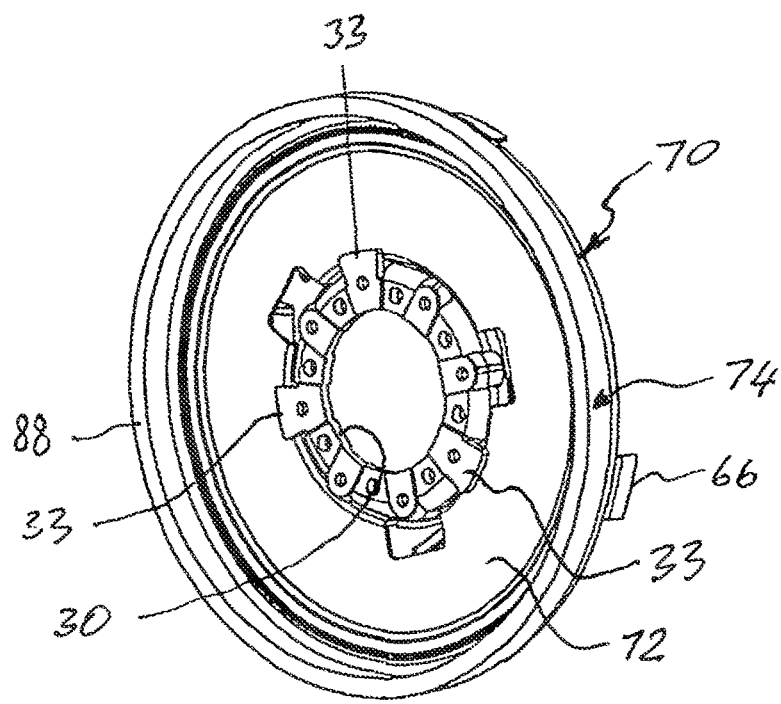
FIG. 14 is a perspective view of a dynamic absorber mounted to the driven member of the torsional vibration damper in accordance with the exemplary embodiment of the present invention.

Further according to the present invention, the driven member 30 has one or more support members 33 formed integral with the rest of the driven member 30, as best shown in FIG. 12. According to the exemplary embodiment of the present invention, as best shown in FIGS. 12 and 14, the driven member 30 has three support members 33. According to the present invention, each of the support members 33 extends substantially radially outwardly and is disposed adjacent to the guided portions 78 of the connecting plate 72. As best shown in FIGS. 2 and 4, the support member 33 radially overlap the connecting plate 72 at an inner periphery thereof so as axially support the connecting plate 72 and restrict the axial movement of the connecting plate 72 in the direction away from the torsional vibration damper 21. Specifically, each of the support members 33 of the driven member 30 has a support surface 35 rotationally slidingly engaging an outer side surface 75 of the connecting plate 72 of the dynamic absorber 70 in the axial direction. In other words, the connecting plate 72 of the dynamic absorber 70 is axially, rotationally guided and centered relative to the rotational axis X by the driven member 30 of the torsional vibration damper 21. Thus, the support members 33 of the driven member 30 provide an axial retention to avoid the dynamic absorber 70 contact with the turbine wheel 15. Preferably, the connecting plate 72 is integrally press-formed from a single sheet-metal blank.

The connecting plate 72 has one or more cutouts 79 formed integral with the rest of the connecting plate 72, as best shown in FIG. 15. The number of the cutouts 79 corresponds to the number of the support members 33 of the driven member 30. According to the exemplary embodiment of the present invention, as best shown in FIGS. 14 and 15, the connecting plate 72 has three cutouts 79. According to the present invention, each of the cutouts 79 extends substantially radially outwardly and has a depth larger than a height of the support member 33 of the driven member 30. Moreover, the support members 33 of the driven member 30 and the cutouts 79 in the connecting plate 72 are not equiangularly spaced apart from each other around the rotational axis X.

The cutouts 79 in the connecting plate 72 are provided to mount the connecting plate 72 to the guiding flange 45 of the driven member 30 of the torsional vibration damper 21.

As best shown in FIG. 18, during the assembly of the connecting plate 72 to the driven member 30, first, the connecting plate 72 is oriented relative the driven member 30 so as to angularly align the cutouts 79 with the support members 33 of the driven member 30. Then, the connecting plate 72 is moved toward the driven member 30 so that the support members 33 of the driven member 30 axially extend through the cutouts 79 until the guided surfaces 78s of the guided portions 78 engage the guiding surface 45s of the guiding flange 45 of the driven member 30. Next, the connecting plate 72 is rotated relative to the driven member 30 so that the outer side surface 75 of the connecting plate 72 engage the support surfaces 35 of the support members 33 of the driven member 30.

Figure 9:
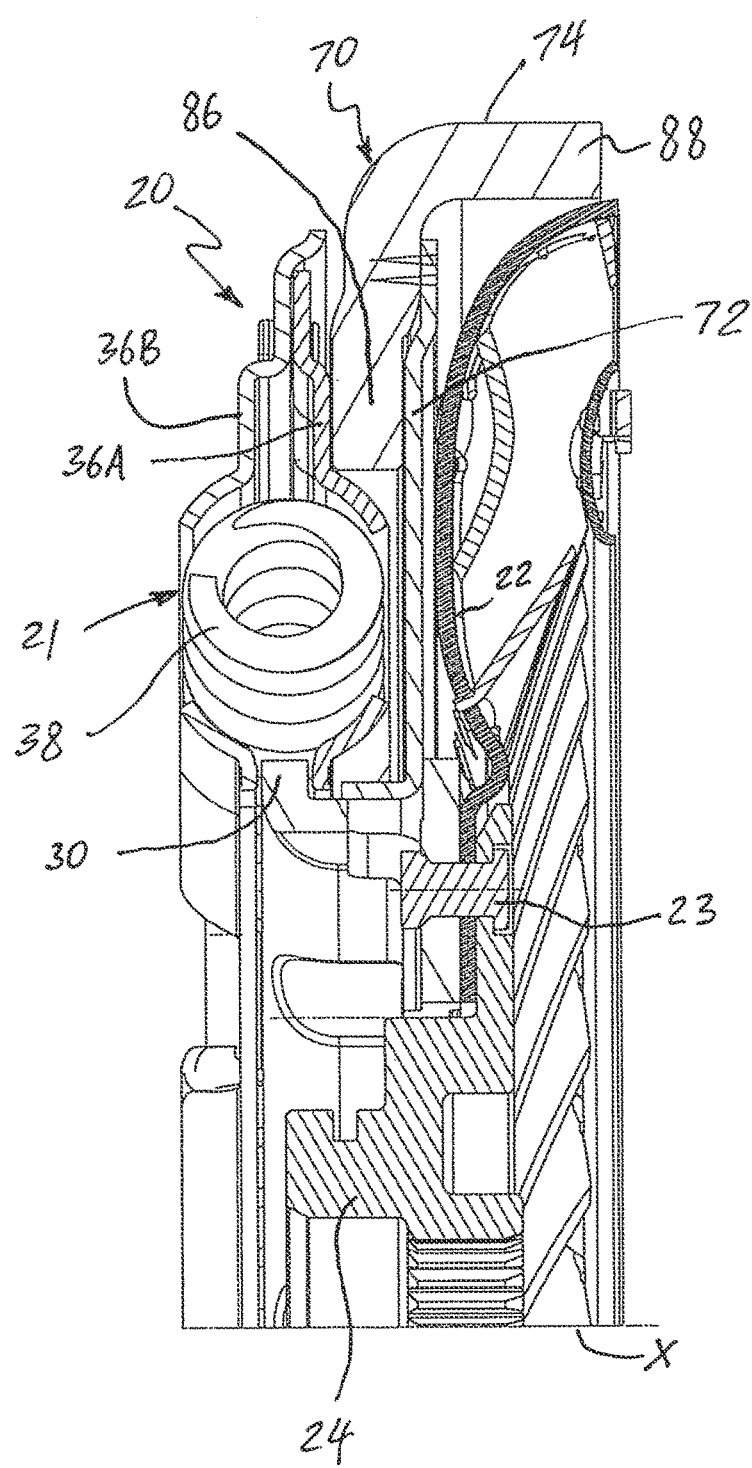
FIG. 9 is a cross-sectional half-view of the torsional vibration damper assembly in accordance with the exemplary embodiment of the present invention taken along the line 9-9 in FIG. 8.
Figure 20:
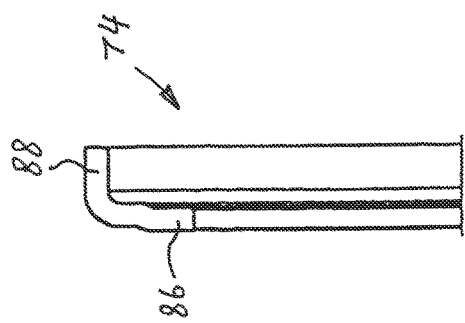
FIG. 20 is a fragmentary side view of the inertial member of the dynamic absorber taken along the line 20-20 in FIG. 19.

The inertial member 74 is a substantially annular heavy wheel (i.e., having a relatively large mass) for opposing and resisting by its inertia fluctuations in speed of the machinery, such as the hydrokinetic torque coupling device, with which it rotates. The inertial member 74 includes a substantially annular support (or connection) portion 86 and a substantially annular inertial portion 88 formed integrally with the support portion 86, as best shown in FIGS. 9 and 20. The inertial member 74 with the support portion 86 and the inertial portion 88 is an integral part, e.g., made of a single-piece or unitary component, but may be separate components fixedly connected together. Preferably, the inertial member 74 is integrally made by stamping into an L-shape or by rolled forming from a strip. Moreover, the inertial portion 88 of the inertial member 74 has a thickness and a mass substantially larger than the thickness and mass of the support portion 86.

Figure 23:
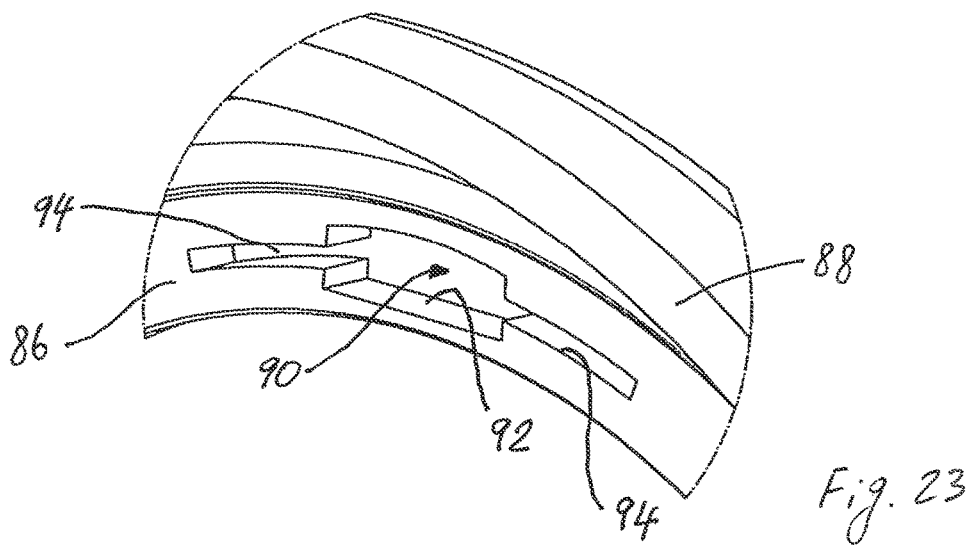
FIG. 23 is an enlarged perspective view of a fragment of the torsional vibration damper assembly shown in the circle "22" of FIG. 5 showing the inertial member only.
Figure 27:
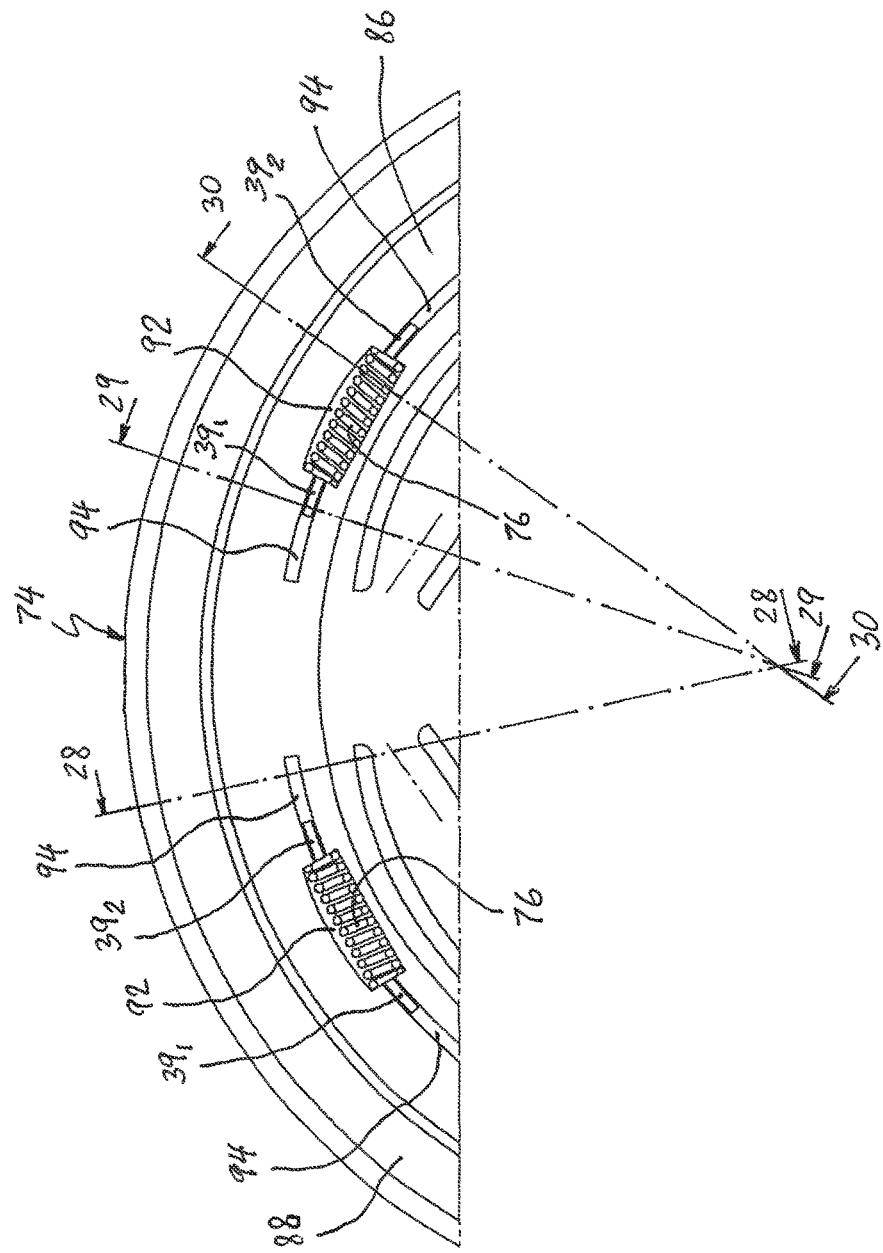
FIG. 27 is a fragmentary plan view of the dynamic absorber taken along the line 27-27 in FIG. 26.
Figure 28:
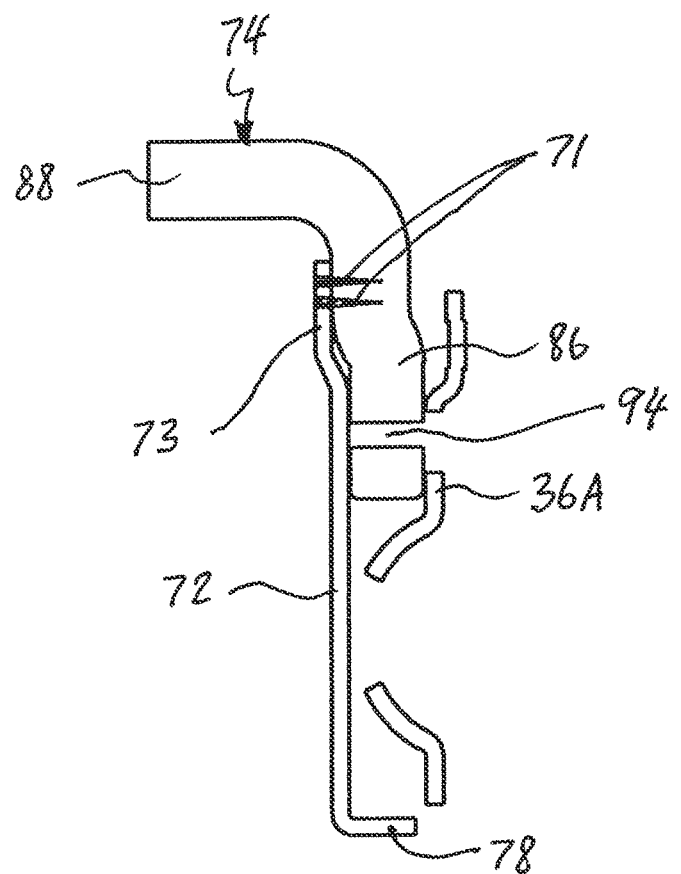
FIG. 28 is a partial sectional view of the dynamic absorber taken along the line 28-28 in FIG. 27.
Figure 29:
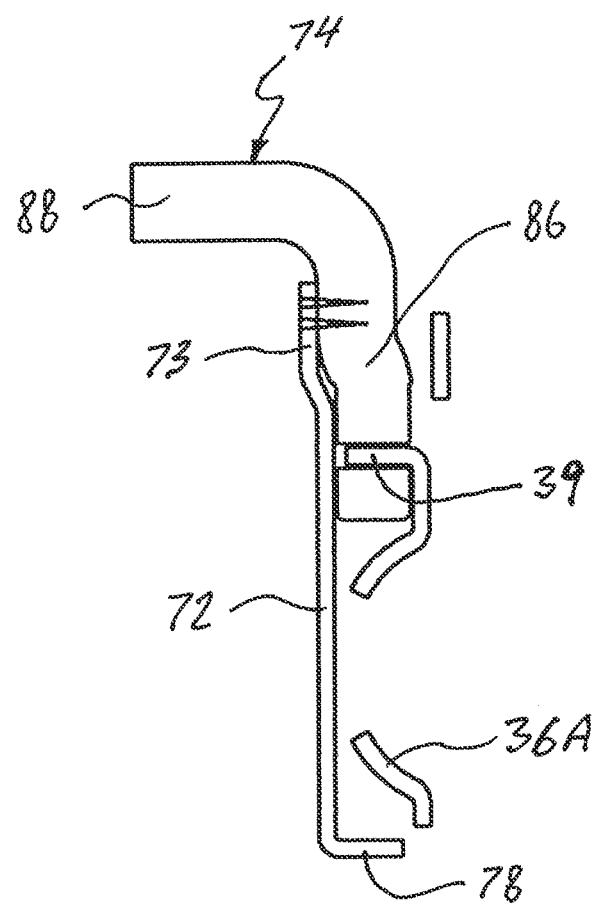
FIG. 29 is a partial sectional view of the dynamic absorber taken along the line 29-29 in FIG. 27.
Figure 30:
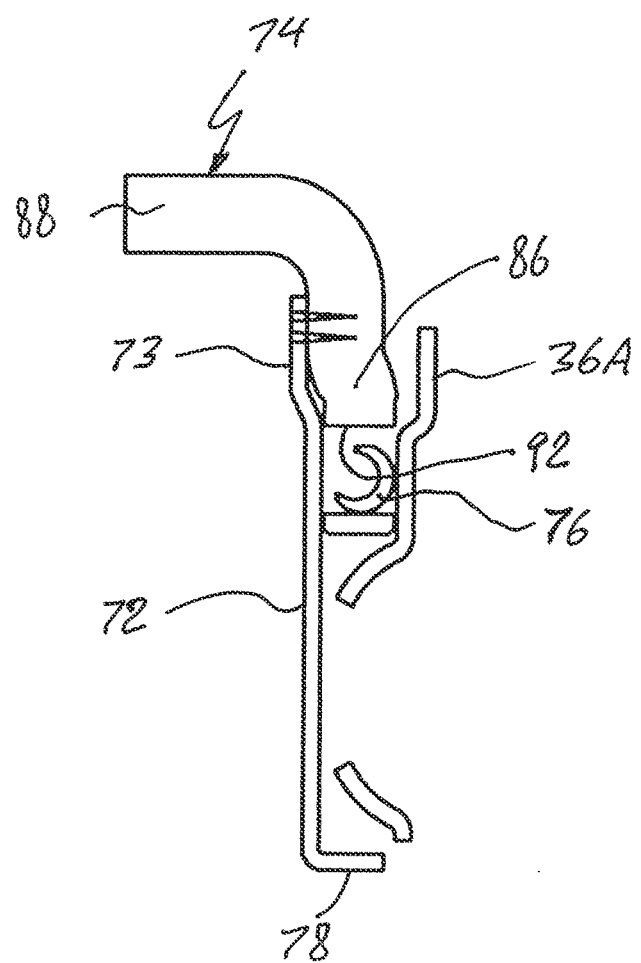
FIG. 30 is a partial sectional view of the dynamic absorber taken along the line 30-30 in FIG. 27.

The support portion 86 of the inertial member 74 is elastically and rotatably coupled to the connecting plates 72 through the absorber elastic members 76 interposed circumferentially in series between the connecting plate 72 and the inertial member 74. The support portion 86 of the inertial member 74 is provided with one or more of circumferentially extending windows (or window-shaped openings) 90, each of which is arranged in correspondence with one of the absorber elastic members 76, as best depicted in FIGS. 5, 23 and 27. In other words, each of the windows 90 receives a single one of the absorber elastic members 76. The windows 90 are equiangularly spaced from each other and are separated circumferentially from one another. The support portion 86 of the inertial member 74 according to the exemplary embodiment of the present invention has six windows 90, as best shown in FIGS. 19 and 21.

Figure 19:
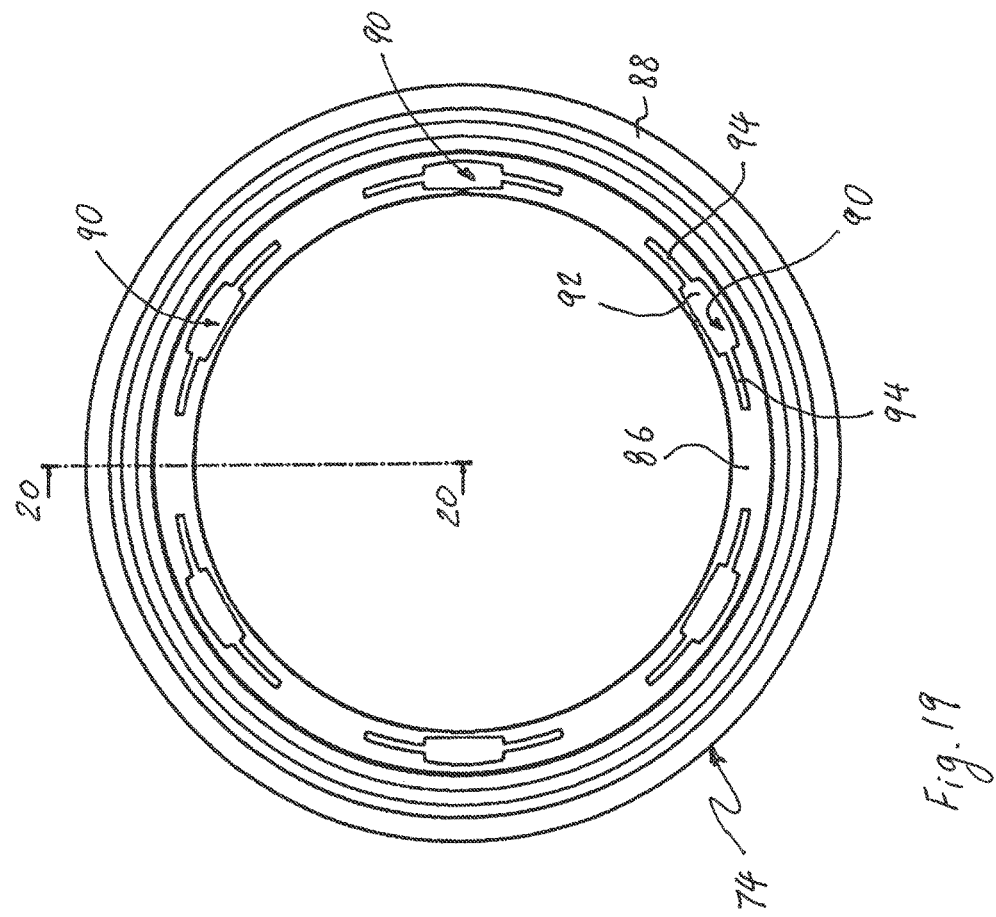
FIG. 19 is a front plan view of an inertial member of the dynamic absorber in accordance with the exemplary embodiment of the present invention.
Figure 21:
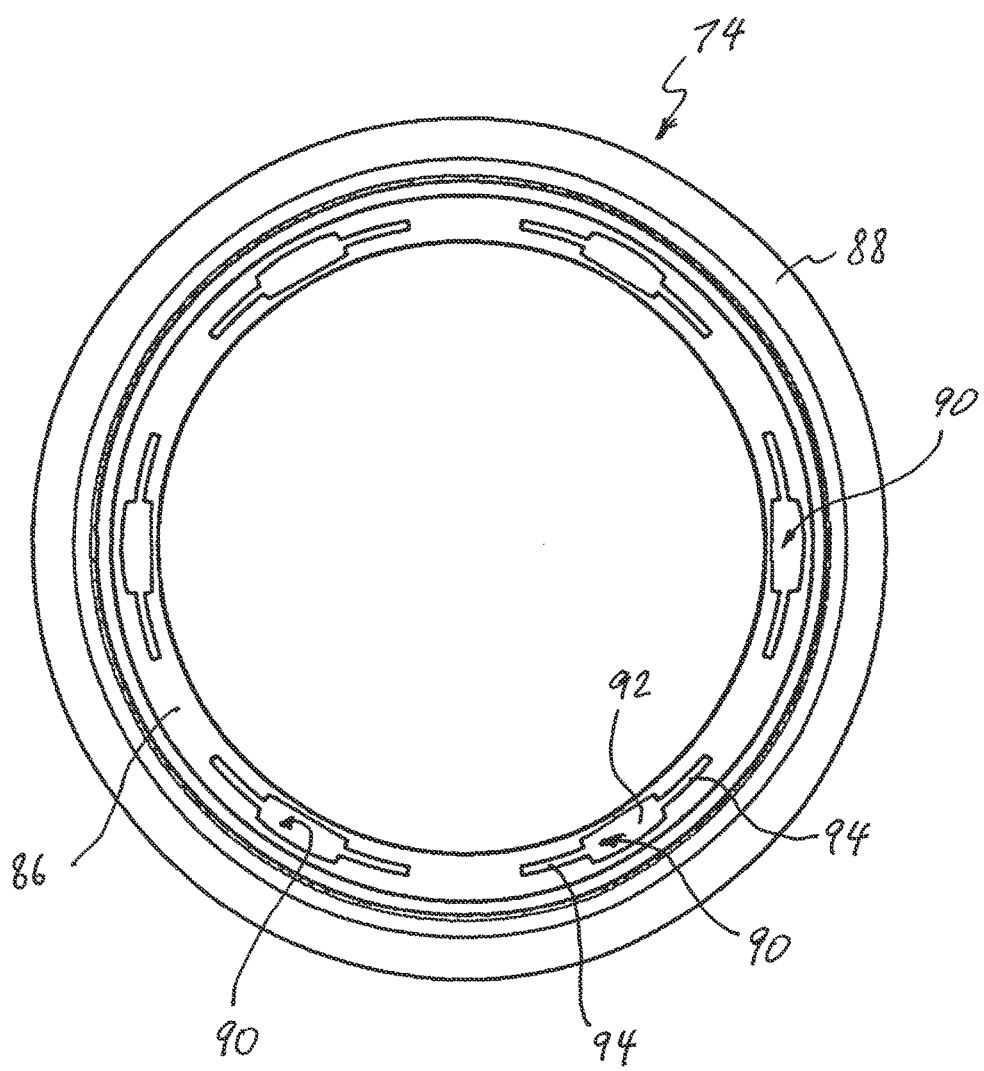
FIG. 21 is a rear plan view of the inertial member of the dynamic absorber in accordance with the exemplary embodiment of the present invention.
Figure 22:
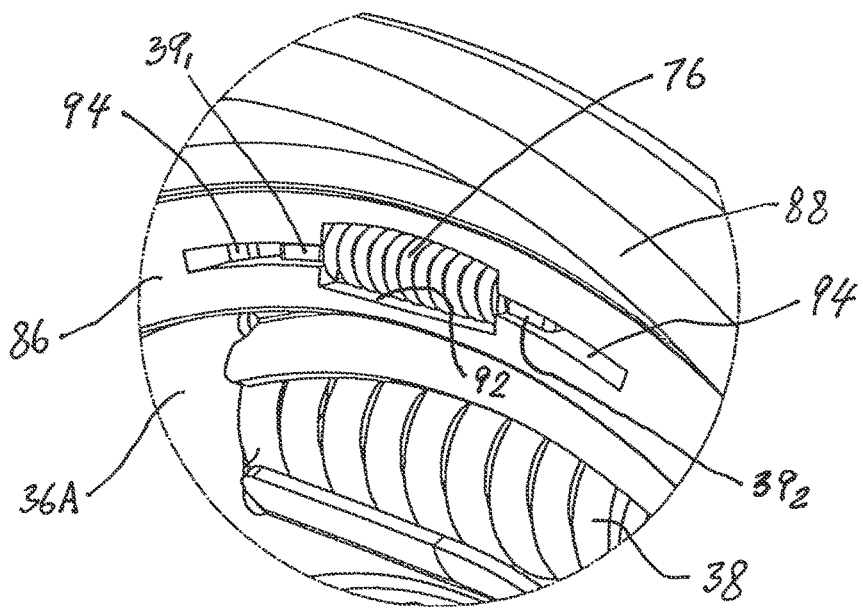
FIG. 22 is an enlarged perspective view of a fragment of the torsional vibration damper assembly shown in the circle "22" of FIG. 5.

As further illustrated in FIGS. 19, 21 and 23, each of the windows 90 includes a large central portion 92 and two opposite curved slit portions 94 circumferentially extending from circumferentially opposite sides of the central portion 92 of the window 90. As shown, a radial size of the central portion 92 of the window 90 is larger than a radial size of the curved slit portions 94 thereof. According to the present invention, each of the absorber elastic members 76 is received in the central portion 92 of one of the windows 90, as best shown in FIGS. 5, 22 and 27.

Figure 24:
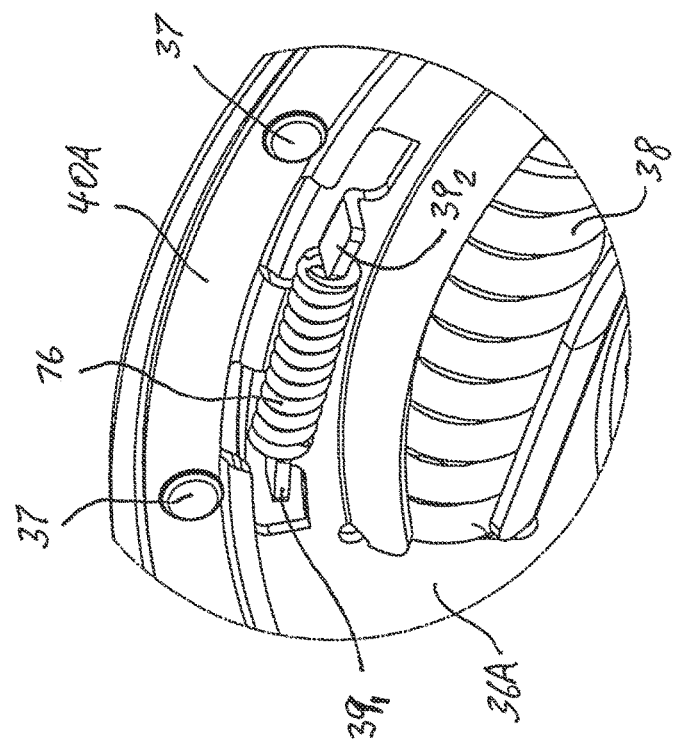
FIG. 24 is an enlarged perspective view of a fragment of the torsional vibration damper assembly shown in the circle "22" of FIG. 5 without the inertial member and absorber elastic members.
Figure 25:
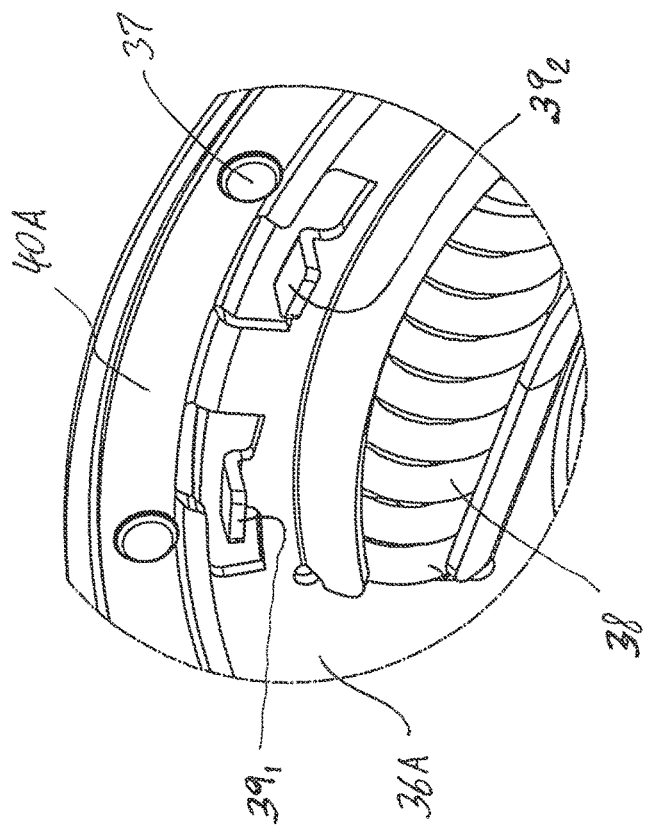
FIG. 25 is an enlarged perspective view of a fragment of the torsional vibration damper assembly shown in the circle "22" of FIG. 5 without the inertial member.
Figure 26:
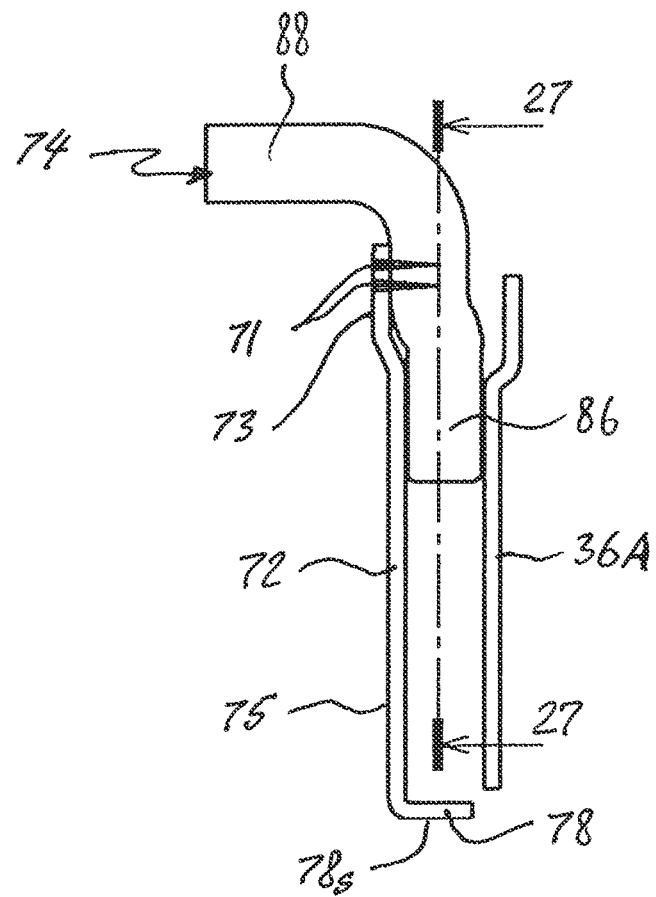
FIG. 26 is a fragmentary cross-sectional half-view of the dynamic absorber in accordance with the exemplary embodiment of the present invention with a first retainer plate of the torsional vibration damper.

Moreover, as best shown in FIGS. 10, 11 and 24, the first retainer plate 36A further includes one or more pairs of driving tabs $39_1$ and $39_2$ extending axially outwardly from the first retainer plate 36A away from the second retainer plate 36B toward the turbine wheel 15 and the dynamic absorber 70. According to the exemplary embodiment of the present invention, the driving tabs $39_1$ and $39_2$ are integrally press-formed with the first retainer plate 36A so as to be equiangularly spaced from each other. The driving tabs $39_1$ and $39_2$ have circumferentially opposite abutment surfaces on circumferential ends of the mutually facing driving tabs $39_1$ and $39_2$. Each pair of the driving tabs $39_1$ and $39_2$ of the first retainer plate 36A engages angularly opposite distal ends of one the absorber elastic members 76, as best shown in FIG. 25. At the same time, each of the absorber elastic members 76 and the corresponding pair of the driving tabs $39_1$ and $39_2$ of the first retainer plate 36A are disposed in one of the windows 90 formed in the support portion 86 of the inertial member 74. More specifically, each of the absorber elastic members 76 is received in the central portion 92 of one of the windows 90, while the driving tabs $39_1$ and $39_2$ are angularly slidably disposed in the curved slit portions 94 of the same window 90, as best shown in FIGS. 22 and 27. Thus, the first retainer plate 36A is operatively, elastically and rotatably connected to the inertial member 74 of the dynamic absorber 70 through the absorber elastic members 76.

During operation of the torsional vibration damper assembly 20, the power inputted into the first and second retainer plates 36A, 36B of the torsional vibration damper 21 is transmitted to the turbine hub 24 through the intermediate member 34, the damper elastic members 38 and the driven member 30. Specifically, the damper elastic members 38 are compressed between the external radial lugs 46 of the driven member 30 and the internal radial lugs 52 of the intermediate member 34 of the torsional vibration damper 21, in order to damp abrupt changes in torque. Therefore, variation in rotation of the engine can be effectively dampened. Moreover, the dynamic absorber 70 is operationally coupled to the first retainer plate 36A through the absorber elastic members 76. Specifically, the inertial member 74 of the dynamic absorber 70 is elastically coupled through the absorber elastic members 76 to the first retainer plate 36A, which is rotatably connected to the intermediate member 34, thus the turbine hub 24. Also, when the rotational speed of an engine is reduced, variation in rotation of the engine caused by fluctuation in combustion is considerably increased. Subsequently, the inertial member 74 of the dynamic absorber 70 reduces fluctuation in rotational speed of the turbine wheel 15 as an output-side component at a relatively low engine rotational speed of the engine (such as about 1000-1400 rpm).

The dynamic absorber 70 is rotationally guided and radially centered relative to the rotational axis X by the connecting plate 72 rotationally slidingly engaging the guiding surface 45s of the guiding flange 45 of the driven member 30 of the torsional vibration damper 21, as best shown in FIGS. 2 and 4. Moreover, the support members 33 of the driven member 30 axially support the connecting plate 72 of the dynamic absorber 70 and restrict the axial movement of the connecting plate 72 in the direction away from the torsional vibration damper 21.

An exemplary method for assembling the hydrokinetic torque coupling device 10 according to the embodiment of FIGS. 1-30 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices 1-30 may be practiced by sequentially performing the steps as set forth below, it should be understood that the methods may involve performing the steps in different sequences.

The turbine wheel 15, the impeller wheel 16, the stator 17, and the torsional vibration damper 21 may each be preassembled. The turbine wheel 15, the impeller wheel 16, and the stator 17 are assembled together so as to form the torque converter 14. Next, the absorber elastic members 76 is mounted to the first retainer plate 36A so that each pair of the driving tabs $39_1$ and $39_2$ of the first retainer plate 36A engages angularly opposite distal ends of one the absorber elastic members 76, as best shown in FIG. 25. Then, the inertial member 74 of the dynamic absorber 70 is mounted to the first retainer plate 36A of the torsional vibration damper 21 so that each of the absorber elastic members 76 is received in the central portion 92 of one of the windows 90 of the inertial member 74, while the driving tabs $39_1$ and $39_2$ are disposed in the curved slit portions 94 of the same window 90, as best shown in FIGS. 22 and 27. Next, the connecting plate 72 is mounted to the driven member 30 by, first, orienting the connecting plate 72 relative the driven member 30 so as to angularly align the cutouts 79 with the support members 33 of the driven member 30, then displacing the connecting plate 72 toward the driven member 30 so that the support members 33 of the driven member 30 axially extend through the cutouts 79 until the guided surfaces 78s of the guided portions 78 engage the guiding surface 45s of the guiding flange 45 of the driven member 30 axially past the support members 33. Next, the connecting plate 72 is rotated relative to the driven member 30 so that the outer side surface 75 of the connecting plate 72 engage the support surfaces 35 of the support members 33 of the driven member 30. Then, the connecting plate 72 is non-rotatably attached to the support portion 86 of the inertial member 74 of the dynamic absorber 70 by any appropriate means, such as by laser welding.

Then, the turbine shell 22 of the turbine wheel 15 is non-movably (i.e., fixedly) secured to both the turbine hub 24 and the driven member 30 by appropriate means, such as by the rivets 23 or welding. Next, the locking piston 28 is slidably mounted to the turbine hub 24. After that, the torque converter 14 with the torsional vibration damper 21 and the dynamic absorber 70 are sealed in the casing 12.

Various modifications, changes, and alterations may be practiced with the above-described embodiment.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A torsional vibration damper assembly for a hydrokinetic torque coupling device, comprising: a torsional vibration damper; and a dynamic absorber operatively connected to the torsional vibration damper, the torsional vibration damper comprising: an integral driven member rotatable about a rotational axis; a first retainer plate rotatable relative to the driven member coaxially with the rotational axis; and a plurality of damper elastic members interposed between the first retainer plate and the driven member, the damper elastic members elastically coupling the first retainer plate to the driven member; and the dynamic absorber including an inertial member, the inertial member mounted to the torsional vibration damper rotatably relative to the driven member, the inertial member being rotationally guided and centered relative to the rotational axis by the driven member of the torsional vibration damper, said dynamic absorber further including a connecting plate non-rotatably secured to the inertial member of the dynamic absorber and directly rotationally slidingly engaging the driven member of the torsional vibration damper; and at least one circumferentially acting absorber elastic member, spaced from the driven member, interposed axially between the first retainer plate of the torsional vibration damper and the connecting plate of the dynamic absorber, the at least one absorber elastic member elastically coupling the first retainer plate to the inertial member, wherein the at least one absorber elastic member is interposed angularly between the first retainer plate and the inertial member, wherein the inertial member and the connecting plate are rotatable relative to the first retainer plate coaxially with the rotational axis, and wherein the inertial member is provided with at least one window receiving the at least one absorber elastic member.

2. The torsional vibration damper assembly as defined in claim 1, wherein the driven member has an axially extending guiding flange and a radially inwardly extending flange disposed radially inside of the guiding flange so that the dynamic absorber is rotationally guided and radially centered relative to the rotation axis by directly rotationally slidingly engaging the guiding flange of the driven member.

3. The torsional vibration damper assembly as defined in claim 1, further comprising a second retainer plate non-moveably secured to the first retainer plate coaxially with the rotational axis, wherein the first retainer plate and the second retainer plate are mounted adjacent to axially opposite surfaces of the driven member, and wherein the second retainer plate is operatively connected to the damper elastic members so that the second retainer plate is elastically coupled to the driven member.

4. The torsional vibration damper assembly as defined in claim 1, wherein the torsional vibration damper further comprises an intermediate member rotatable relative to the first retainer plate and the driven member about the rotational axis, wherein the damper elastic members are interposed between the first retainer plate and the intermediate member, and between the intermediate member and the driven member in series.

5. The torsional vibration damper assembly as defined in claim 1, wherein the dynamic absorber is mounted to the first retainer plate and the driven member of the torsional vibration damper.

6. The torsional vibration damper assembly as defined in claim 1, wherein the inertial member of the dynamic absorber is a single-piece component.

7. The torsional vibration damper assembly as defined in claim 1, wherein the connecting plate has at least one circumferentially extending guided portion extending axially from the connecting plate, wherein the at least one circumferentially extending guided portion rotationally slidingly engages the driven member of the torsional vibration damper.

8. The torsional vibration damper assembly as defined in claim 7, wherein the driven member has a guiding flange extending both circumferentially and axially, and wherein the at least one guided portion of the connecting plate of the dynamic absorber rotationally slidingly engages the guiding flange of the driven member.

9. The torsional vibration damper assembly as defined in claim 1, wherein the inertial member includes a support portion elastically coupled to the first retainer plate via the at least one absorber elastic member, and an inertial portion formed integrally with the support portion.

10. The torsional vibration damper assembly as defined in claim 9, wherein the support portion extends substantially radially and the inertial portion extends substantially axially outwardly from the support portion so that the inertial member has an L-shape.

11. The torsional vibration damper assembly as defined in claim 1, wherein the driven member has at least one integral support member extending substantially radially outwardly, and wherein the at least one support member radially overlaps the connecting plate at an inner periphery thereof and rotationally slidingly engages the connecting plate in the axial direction so as axially support the connecting plate and restrict the axial movement of the connecting plate in the direction away from the first retainer plate.

12. The torsional vibration damper assembly as defined in claim 11, wherein the driven member has a plurality of integral support members each extending substantially radially outwardly, and wherein each of the support members radially overlaps the connecting plate at the inner periphery thereof and rotationally slidingly engages the connecting plate in the axial direction so as axially support the connecting plate and restrict the axial movement of the connecting plate in the direction away from the first retainer plate.

13. The torsional vibration damper assembly as defined in claim 1, wherein there are a plurality of windows and each window includes a large central portion and two opposite curved slit portions circumferentially extending from opposite sides of the central portion of the window, wherein a radial size of the central portion of the window is larger than a radial size of the curved slit portions thereof.

14. The torsional vibration damper assembly as defined in claim 13, wherein the first retainer plate includes at least one pair of driving tabs extending axially outwardly from the first retainer plate so that the at least one pair of the driving tabs of the first retainer plate engages angularly opposite distal ends the at least one absorber elastic member of the dynamic absorber.

15. The torsional vibration damper assembly as defined in claim 14, wherein the at least one absorber elastic member is received in the central portion of the at least one window, and the driving tabs of the at least one pair of driving tabs are angularly slidably disposed in the curved slit portions of the at least one window.

16. A hydrokinetic torque coupling device for coupling together a driving shaft and a driven shaft, the torque coupling device comprising: an impeller coaxially aligned with a rotational axis and comprising an impeller shell; a casing comprising the impeller shell and a casing shell interconnected to and non-rotatable relative to the impeller shell; a turbine coaxially aligned with and drivable by the impeller, the turbine comprising a turbine shell; a stator situated between the impeller and the turbine; a torsional vibration damper; a turbine hub; and a dynamic absorber including an inertial member and operatively connected to the torsional vibration damper; the torsional vibration damper comprising: an integral driven member rotatable about the rotational axis; a first retainer plate rotatable relative to the driven member coaxially with the rotational axis; and a plurality of damper elastic members interposed between the first retainer plate and the driven member, the damper elastic members elastically coupling the first retainer plate to the driven member; the turbine hub non-rotatably coupled to the turbine shell and the driven member of the torsional vibration damper; the inertial member mounted to the torsional vibration damper rotatably relative to the driven member and rotationally guided and centered relative to the rotational axis by the driven member of the torsional vibration damper; wherein the dynamic absorber further includes: a connecting plate non-rotatably secured to the inertial member of the dynamic absorber and directly rotationally slidingly engaging the driven member of the torsional vibration damper; and at least one circumferentially acting absorber elastic member, spaced from the driven member, interposed axially between the first retainer plate of the torsional vibration damper and the connecting plate of the dynamic absorber, the at least one absorber elastic member elastically coupling the first retainer plate to the inertial member, wherein the at least one absorber elastic member are interposed angularly between the first retainer plate and the inertial member, wherein the inertial member and the connecting plate are rotatable relative to the first retainer plate coaxially with the rotational axis, wherein the inertial member of the dynamic absorber is rotatable relative to the first retainer plate, wherein the dynamic absorber is rotationally guided and centered relative to the rotational axis by directly rotationally slidingly engaging the driven member of the torsional vibration damper, and wherein the inertial member is provided with at least one window receiving the at least one absorber elastic member.

17. The hydrokinetic torque coupling device as defined in claim 16, wherein the driven member has an axially extending guiding flange and a radially inwardly extending flange disposed radially inside of the guiding flange so that the dynamic absorber is rotationally guided and radially centered relative to the rotation axis by directly rotationally slidingly engaging the guiding flange of the driven member, and wherein the turbine hub non-moveably connected to the turbine shell and the radially inwardly extending flange of the driven member of the torsional vibration damper.

18. The hydrokinetic torque coupling device as defined in claim 16, further comprising a lock-up clutch selectively interconnecting the turbine and the casing; wherein the lock-up clutch includes a locking piston configured to move axially toward and away from the casing; and wherein the first retainer plate is operatively connected to the locking piston of the lock-up clutch.

19. A method for assembling a torsional vibration damper assembly for a hydrokinetic torque coupling device, the method comprising the steps of: providing a preassembled torsional vibration damper comprising: an integrally formed driven member rotatable about the rotational axis; a first retainer plate rotatable relative to the driven member coaxially with the rotational axis; and a plurality of damper elastic members interposed between the first retainer plate and the driven member, the damper elastic members elastically coupling the first retainer plate to the driven member; providing a dynamic absorber including an inertial member, said dynamic absorber further including, a connecting plate non-rotatably secured to the inertial member of the dynamic absorber and rotationally slidingly engaging the driven member of the torsional vibration damper; and at least one circumferentially acting absorber elastic member, spaced from the driven member, interposed axially between the first retainer plate of the torsional vibration damper and the connecting plate of the dynamic absorber, the at least one absorber elastic member elastically coupling the first retainer plate to the inertial member, wherein the at least one absorber elastic member is interposed angularly between the first retainer plate and the inertial member, wherein the inertial member and the connecting plate are rotatable relative to the first retainer plate coaxially with the rotational axis, and wherein the inertial member is provided with at least one window receiving the at least one absorber elastic member; and mounting the dynamic absorber directly to the driven member of the torsional vibration damper so that the dynamic absorber is rotationally guided and centered relative to the rotational axis by the driven member of the torsional vibration damper.

20. The method as defined in claim 19, wherein the driven member has an axially extending guiding flange and a radially inwardly extending flange disposed radially inside of the guiding flange so that the dynamic absorber is rotationally guided and radially centered relative to the rotation axis by directly rotationally slidingly engaging the guiding flange of the driven member.

* * * * *